(12) United States Patent
Wong et al.

(10) Patent No.: US 12,495,443 B2
(45) Date of Patent: Dec. 9, 2025

(54) SYSTEM AND METHOD FOR COMPENSATION FOR GAPPED DATA PACKETS DURING POLLING FOR COMMUNICATION BETWEEN A WIRELESS INPUT/OUTPUT (IO) DEVICE AND A WIRELESS COMMUNICATION DONGLE

(71) Applicant: Dell Products, LP, Round Rock, TX (US)

(72) Inventors: Kai Leong Wong, Singapore (SG); Jui Chang Liu, New Taipei (TW); Karthikeyan Krishnakumar, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 327 days.

(21) Appl. No.: 18/229,584

(22) Filed: Aug. 2, 2023

(65) Prior Publication Data

US 2025/0048422 A1     Feb. 6, 2025

(51) Int. Cl.
```
G06F 3/038      (2013.01)
G06F 3/0354     (2013.01)
H04W 74/06      (2009.01)
```

(52) U.S. Cl.
CPC ........ H04W 74/06 (2013.01); G06F 3/03543 (2013.01); G06F 3/0383 (2013.01); G06F 2203/0384 (2013.01)

(58) Field of Classification Search
CPC .... G06F 1/3203; G06F 1/3271; G06F 3/0383; G06F 3/03543; G06F 16/44; H04W 52/0229; H04W 74/06

USPC ............... 370/394, 474; 345/156, 157, 163
See application file for complete search history.

(56) References Cited

U.S. PATENT DOCUMENTS

| | | | |
|---|---|---|---|
| 7,660,611 B1 * | 2/2010 | Asbury | G06F 1/3271 |
| | | | 345/168 |
| 7,801,099 B2 | 9/2010 | Desai | |
| 7,853,663 B2 | 12/2010 | Hoerl | |
| 8,364,080 B2 | 1/2013 | Desai | |

(Continued)

FOREIGN PATENT DOCUMENTS

| | | | |
|---|---|---|---|
| EP | 1841149 B1 | 11/2017 | |
| WO | WO-2016005989 A1 * | 1/2016 | ............. G06F 3/038 |

*Primary Examiner* — Harun Chowdhury
(74) *Attorney, Agent, or Firm* — Prol Intellectual Property Law, PLLC; H. Kenneth Prol

(57) ABSTRACT

A wireless IO device gapped position offset value compensation system of a wireless communication dongle at an information handling system may comprise a controller to transmit with a wireless radio system an initial polling packet instructing a wireless mouse to transmit data packets including wireless mouse position offset values within a first data packet frame and to transmit, during an interframe time slot, an updated polling packet to instruct the wireless mouse to transmit data packets within a second data packet frame. The controller to translate the wireless mouse position offset values from received payloads into cursor positional data values, and to estimate a next cursor positional data value during the interframe polling packet time slot based on received wireless mouse position offset values, and the controller to communicate to the information handling system the cursor positional data values and the next estimated cursor positional data value.

20 Claims, 4 Drawing Sheets

(56) References Cited

U.S. PATENT DOCUMENTS

| | | |
|---|---|---|
| 8,913,599 B2 | 12/2014 | Gonikberg |
| 11,653,057 B2 | 5/2023 | Sudak |
| 2020/0215433 A1* | 7/2020 | Ahmed .................. G06F 16/44 |
| 2021/0204212 A1* | 7/2021 | Kumar .............. H04W 52/0229 |

* cited by examiner

SYSTEM AND METHOD FOR COMPENSATION FOR GAPPED DATA PACKETS DURING POLLING FOR COMMUNICATION BETWEEN A WIRELESS INPUT/OUTPUT (IO) DEVICE AND A WIRELESS COMMUNICATION DONGLE

FIELD OF THE DISCLOSURE

The present disclosure generally relates to wireless peripheral input/output (IO) devices, such as mice, gaming controllers, keyboards, earbuds, headphones, headsets, and virtually reality peripherals. More specifically, the present disclosure relates to a wireless communication from a wireless communication dongle or an information handling system, operating independently from the information handling system operating system (OS) for compensating for a gap in positional data packets providing positional information for a wireless peripheral IO device, such as a wireless mouse, within data packet communication frames transmitted to a wireless communication dongle pursuant to a polling packet.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output (IO) devices such as a keyboard, mouse, touchpad, gaming controller, display device, wearable peripheral device, speakers, earbud, headphone, microphone, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
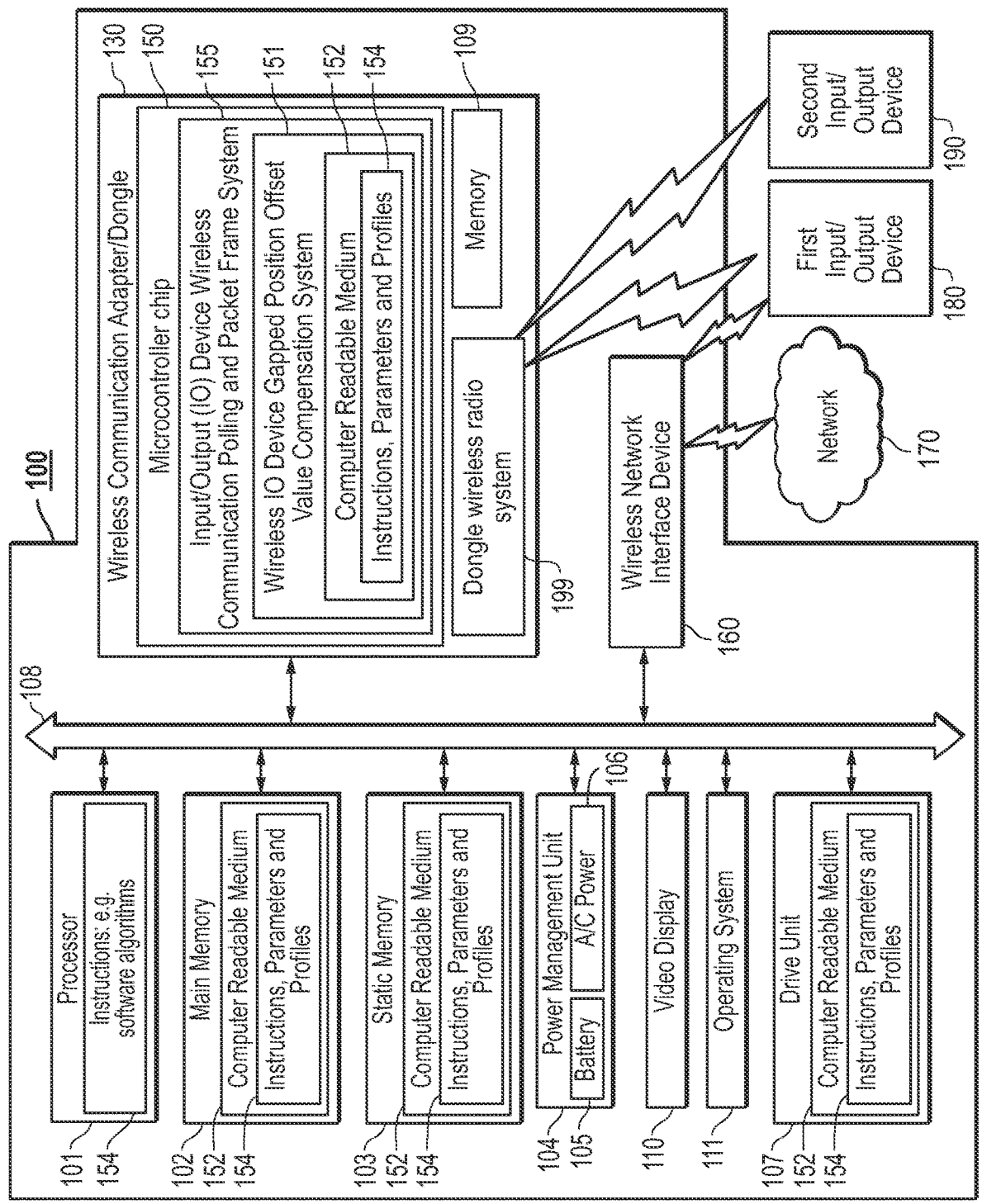
FIG. 1 is a block diagram illustrating an information handling system with a wireless radio system or operatively coupled to a wireless communication dongle orchestrating wireless communication via an input/output (IO) device wireless communication polling and packet frame system with compensation for gapped positional offset values during polling packet transmission for one or more wireless IO devices according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Users of information handling systems such as smart phones, tablets, or laptops may employ a plurality of wireless peripheral input/output (IO) devices (e.g., mouse, keyboard, touchpad, gaming controller, earbuds, headphones, smart speakers, headsets including headphones and speakers, or virtual reality peripherals) located remotely from the information handling system to wirelessly transmit and receive IO data such as keystrokes, mouse positional data, or audiovisual information. Wireless peripheral IO devices are also referred to as wireless IO devices herein. Many existing systems employ a wireless communications dongle operably connected to the information handling system (e.g., desktop, laptop, or tablet computer) to pair with and communicate wirelessly with one or more of these wireless IO devices. In other embodiments, a wireless communication dongle may be integrated as part of the wireless radio adapter internal to the information handling system for pairing with and communicating wirelessly with one or more of these wireless IO devices. Many manufacturers of these wireless IO devices build these devices to provide the most basic or rudimentary communication capabilities that comply with the Bluetooth® Low Energy (BLE) communication standard.

For example, many existing wireless IO devices are designed to communicate with a wireless communications dongle using a one reception/one transmission (1RX/1TX) format that requires a wireless communications dongle to respond to every data packet received from a wireless IO device by transmitting an acknowledgment (ACK) data packet. In other words, each time the wireless communications dongle operating in receive mode receives a data packet, it must then switch to transmit mode and transmit an ACK data packet back to the wireless IO device from which the initial data packet was received. The wireless communications dongle may then switch back to a receive mode to receive the next data packet from the wireless IO device. This process may be repeated each time a new data packet is generated at the wireless IO device, for example. More specifically, in the case of a wireless mouse, this process may be repeated each time the wireless mouse determines the location of the mouse has changed, prompting a correlated change in the position of a cursor within a display device for the information handling system. Thus, this mode-switching may occur multiple times per second in some cases.

Each of these transmission/reception mode switches consumes power, and requires more airtime for acknowledgment (ACK) data packets acknowledging receipt of wireless IO device input data packets at the wireless radio system for the wireless communication dongle or information handling system. Such a 1RX/1TX system may be limited in data throughput, consume power unnecessarily for such transmit and receive switches during operations, and require a certain amount of spacing between transmission of multiple wireless IO device input data packets from the wireless IO device to the wireless communication dongle or information handling system in order to allow for transmission of an ACK data packet in between transmission of such multiple wireless IO device input data packets. Such systems may cause the customer to experience slow response from a wireless IO device, or a lag between their input via the wireless IO device (e.g., movement of the mouse) and the corresponding feedback displayed by the information handling system (e.g., movement of the cursor). As a result, existing systems employing this 1RX/1TX approach may fail to meet customer needs for wireless IO device and dongle reporting rates to the operating system during execution of latency-sensitive software applications such as gaming applications or other high definition audio/visual applications.

Embodiments of the present disclosure employ a customized wireless IO device communication protocol by performing data modulation on wireless IO device data packets transceived using the BLE radio layer protocol in order to allow for transmission of a plurality of data packets in a data packet communication frame from the wireless IO device to the wireless radio system between polling packets having ACK data transmitted from the wireless radio system to the wireless IO device. During an interframe polling packet timeslot when these polling packets are delivered to the wireless IO device, there is a gap in reporting rate of wireless IO device data packets. A controller for a wireless radio system of a wireless communication dongle may execute code instructions, such as firmware, of an IO device wireless communication polling and packet frame system compensation of gapped position offset values for the wireless IO device according to embodiments of the present disclosure.

In embodiments of the present disclosure, a wireless radio adapter, such as in a wireless communications dongle, may receive a request to connect from one or more wireless IO devices (e.g., mouse and gaming controller), and may respond by transmitting a polling packet that instructs each of the wireless IO devices paired with the wireless communications dongle to transmit a selected number of data packets of a selected packet length and at specified time slots during a first data packet communication frame between the wireless communications dongle and each of the paired wireless IO devices. The controller for a wireless radio system of a wireless communication dongle or information handling system in embodiments may orchestrate scheduled delivery of a plurality of data packets from each of one or more wireless IO devices in a data packet communication frame between delivery of ACK data in a polling packet with instructions for a selected number of data packets and selected data packet length in allotted time slots to each of the one or more wireless IO devices. The controller for a wireless radio system of a wireless communication dongle or information handling system in embodiments may also estimate or project a next wireless IO device position offset value to be received in a later data packet communication frame for during the interframe polling packet timeslot to maintain a smooth dongle report rate.

The controller at the wireless communications dongle may ensure that, during the received data packet communication frame in which time slots have been allocated to the one or more wireless IO devices (e.g., mouse and gaming controller), the wireless radio system, such as in the wireless communication dongle, remains in a receive mode to receive a selected number of wireless IO device input data packets from the one or more paired wireless IO devices in accordance with the selected number of packets prescribed and the duration (e.g., based on packet lengths) from each of the one or more wireless IO devices in the polling packet. Following the receipt of the data packet communication frame at the end of a time period determined by the number of packets expected, packet lengths, and any spacing time, the controller of the wireless communications dongle or other wireless radio adapter may switch to transmit mode and transmit to each of the paired wireless IO devices an acknowledgement (ACK) as part of a next polling packet identifying the selected number of packets and selected data packet length received during the data packet communication frame from each of the paired wireless IO devices. Selected number of data packets and selected data packet lengths may be adjusted on the fly for wireless IO devices, such as through the polling packets. Such an orchestrated delivery of a selected number of wireless IO device input data packets within the data packet communication frame may allow for the transmission of a wireless IO device input data packet up to every 0.000125 seconds (125 μs), or at a rate of 8,000 packets per second in one example embodiment. Use of this orchestrated delivery method in embodiments of the present disclosure may allow the wireless IO device to transmit input data (e.g., positional information from a mouse or positional information of a gaming controller) at a high transmission or report rate, and also to register that input data within the wireless IO device at a high sample rate. In other words, a wireless mouse or gaming controller may take positional measurements more frequently, or a keyboard may register keystrokes in smaller intervals.

Existing wireless IO devices transceive data packets adhering to the Universal Serial Bus (USB) Human Interface Device (HID) reporting formats for various types of devices that is not well-suited for these higher sample rates. For example, a wireless mouse or gaming controller may transceive positional information for the mouse or gaming controller according to the USB HID reporting format that requires the positional data to include a six byte description of an initial position and a six byte description of a next adjusted position for the mouse or the gaming controller console. However, positional data sampled in intervals less than 250-500 microseconds apart may be expressed by providing the initial position, along with a change in position, or position offset value away from this initial position instead. Such a change in position or position offset value may be expressed in two bytes, in comparison to the six bytes describing a next adjusted position. The IO device wireless communication polling and packet frame system of the present disclosure may orchestrate compression of wireless IO device input data packet payloads prior to transmission of those wireless IO device compressed input data packets and decompression of the payload from the wireless IO device compressed input data packets at a communication dongle or wireless radio of an information handling system to take advantage of these smaller data payload capabilities and improve wireless transmission performance with improved dongle report rates to an information handling system.

In embodiments of the present disclosure, the initial polling packet transmitted by the controller for the wireless communication dongle or information handling system may define a selected number of compressed input data packets (e.g., four) and a selected compressed data packet length (e.g., in bytes) that instructs the number and length of data packets the wireless IO device should transmit to the wireless communication dongle or information handling system during the next data packet communication session and that the data packets should be compressed according to type of wireless IO device. The wireless IO device (e.g., mouse or gaming controller) that receives this initial polling packet may use these selected packet number or selected packet length from within the initial polling packet to set a sample rate at which the wireless IO device (e.g., mouse) takes input (e.g., measures position of the mouse). For example, in an embodiment in which the initial polling packet instructs delivery of a wireless IO device compressed input data every 125 μs (e.g., to give a transmission rate of 8,000 packets per second), the wireless IO device may set its sample rate to 125 μs or less. In the case of a mouse, this indicates positional measurements taken every 125 μs.

Setting of such a high sample rate or selection within the initial polling packet of a shorter wireless IO device compressed input data length in embodiments of the present disclosure may prompt a microcontroller executing code instructions of an IO device wireless communication polling and packet frame agent to compress the wireless IO device input data detected at the wireless IO device prior to transmission of that wireless IO device input data as a payload of a wireless IO device compressed input data packet to the wireless communication dongle or information handling system. For example, the initial polling packet in embodiments may instruct transmission of four wireless IO device compressed input data packets in intervals of 125 μs or less, as a data packet communication frame with a total duration of less than 500 μs. A first wireless IO device compressed input data packet of a first data packet communication frame (e.g., initial transmission of data from the wireless IO device to the wireless communication dongle upon establishment of a wireless link) in embodiments of the present disclosure may include a payload comprising a six byte initial position for the wireless IO device and a two byte position offset value indicating a change in the position of the wireless IO device from the initial position. In later-transmitted wireless IO device compressed input data packets of the first data packet communication frame or of later data packet communication frames, the payload may omit the initial position and provide only the wireless IO device position offset value sampled by the wireless IO device during the most recent interval between transmitted wireless IO device compressed input data packets. This compressed expression of positional measurement may decrease the size of the wireless IO device compressed input data containing this compressed positional measurement in comparison to the size of a wireless IO device input data packet containing positional measurement adhering to the USB HID format over plural positional data values.

Upon receipt of such wireless IO device compressed input data packets at the wireless radio system for the wireless communication dongle or the information handling system along with header information identifying the type of wireless IO device, the controller for the wireless radio system in embodiments herein may retranslate the compressed wireless IO device input data into the USB HID format for that wireless IO device. For example, the position of a cursor corresponding to the position of the wireless IO device (e.g., mouse) in a second packet of the first data packet communication frame in embodiments may be determined by applying the wireless IO device position offset to the initial position given within the first packet of that frame. Similarly, the positional data value for the cursor may be determined for each successively received wireless IO device compressed input data packet by applying the wireless IO device position offset value within the most recently received wireless IO device compressed input data packet and all of the previously received wireless IO device position offset values to the initial position given in the first packet of the first frame. The USB HID report generated in such a way to represent standard HID format for wireless IO device data may then be communicated to the operating system (OS) for the information handling system for processing of the uncompressed or reassembled input data for the wireless IO device. The OS of the information handling system may only operate with wireless IO Device data that is received in this USB HID format for example, thus requiring the reconversion.

The position for the cursor for each successively received wireless IO device compressed input data packet depends upon the wireless IO device position offset value within all of the wireless IO device compressed input data packets received previously. As described directly above, during the polling packet, there is a gap in wireless IO device position offset values during the transmission of the polling packet between data packet communication frames. This may affect the wireless communication dongle report rate to the information handling system. A system is needed to compensate for these gapped wireless IO device position offset values associated with the interframe polling time slot in which the wireless communication dongle is transmitting a polling packet rather than receiving wireless IO device compressed input data packets to maintain the wireless dongle report rate to the information handling system.

Code instructions of the wireless IO device gapped position offset value compensation system are executed by a wireless communication dongle microcontroller in embodiments of the present disclosure to address these issues in a number of ways. For example, the wireless IO device gapped position offset value compensation system in embodiments of the present disclosure may compensate for gapped position offset values by assuming a constant movement occurred during the polling packet interframe time slot for a next wireless IO device compressed input data packet with a next estimated wireless IO device positional offset value during when the wireless communication dongle is transmitting the next polling packet. In other words, the wireless IO device gapped position offset value compensation system in such embodiments may estimate the gapped wireless IO device position offset values during a polling packet interframe time slot based on the previously-received wireless IO device position offset values from wireless IO device compressed input data packets received during the immediately preceding wireless IO device data packet communication frame before polling packet interframe timeslot in which the wireless communication dongle transmits the updated polling packet.

FIG. 1 illustrates an information handling system 100 according to several aspects of the present disclosure. As described herein, an information handling system 100 or a controller 150 of a wireless communications dongle or integrated wireless radio adapter 130 operably connected to the information handling system 100 may execute code instructions of an input/output (IO) device wireless communication polling and packet frame system 155 with a gapped position offset value compensation system 151 in an embodiment to orchestrate scheduled delivery of a plurality of wireless IO device compressed input data packets from each of one or more paired wireless input/output (IO) devices (e.g., 180 and 190) during scheduled data packet communication frames. It is appreciated that information handling system 100 may use a wireless communications dongle or integrated wireless radio adapter 130 to wirelessly communicate with one or more wireless IO devices 180 or 190. In embodiments herein, wireless communications dongle 130 may refer to a dongle operatively coupled to the information handling system 100 such as via a port or may be integrated within the information handling system 100 such as with an integrated wireless radio adapter with antenna system for wireless communication with the wireless IO devices 180 or 190. In various embodiments a wireless communications dongle 130, whether integrated or not within the information handling system 100 may operate using Bluetooth® Low Energy (BLE) radio layer protocol (e.g., BLE radio with Gaussian Frequency Shift Keying (GFSK) data modulation), as modified with the wireless IO device communication protocol of embodiments herein. An information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 152 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware controller, or any combination thereof. Additional components of the information handling system 100 may include one or more storage devices such as static memory 103 or drive unit 107, a wireless network interface device 160, and one or more communications ports for communicating with external devices such as wireless communication adapter/dongle 130 (referred to herein as a wireless communications dongle). A power management unit (PMU) 104 supplying power to the information handling system 100, via a battery 105 or an alternating current (A/C) power adapter 106 may supply power to one or more components of the information handling system 100, including the hardware processor 101, the wireless network interface device 160, a static memory 103 or drive unit 107, the wireless communication adapter/dongle 130, a video display 110, or other components of an information handling system. The video display 110 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 in an embodiment is operably coupled to a wireless communications dongle 130, which may orchestrate scheduled delivery of a selected number of wireless IO device compressed input data packets of selected data packet lengths from each of one or more wireless input/output (IO) devices (e.g., 180 and 190) during scheduled data packet communication frames according to various embodiments of the present disclosure. The wireless communication adapter/dongle 130 in an embodiment may receive a selected number of wireless IO device compressed input data packets of selected data packet length, each comprising a payload of input data from one of the wireless IO devices (e.g., 180 and 190). For example, the wireless communication adapter/dongle 130 in an embodiment may receive a plurality of wireless IO device compressed input data packets from a wireless mouse or gaming controller (e.g., 180), each containing a payload of positional information for the wireless mouse (e.g., 180) comprising compressed positional information from a USB human interface device (HID) formatted report and offset data from one position data point generated at the wireless mouse 180, as described in greater detail below with respect to FIGS. 3 and 4.

Upon receipt of the plurality of wireless IO device compressed input data packets from the wireless IO device(s) (e.g., 180 or 190) in an embodiment, the controller 150 for the wireless communication adapter/dongle 130 may execute code instructions of the IO device wireless communication polling and packet frame system 155 with the gapped position offset value compensation system 151 to generate a USB HID formatted report that contains the uncompressed wireless IO device input data from wireless IO device position offset data contained within the received wireless IO device compressed input data packets in a data packet frame to send to operating system (OS) 111. The information handling system 100 may include an operating system (OS) 111 that processes incoming data from various IO devices, including the wireless IO devices 180 and 190, such as for cursor movement. Such an OS 111 in an embodiment may be capable of processing such IO data only when received in the USB HID format. As described herein, the wireless IO device compressed input data packets may only include a portion of information required for a USB HID report meeting these standards such as a first HID format for positional data or a position offset value that may be used to determine an updated wireless IO device position. As such, the controller 150 in an embodiment may execute code instructions of the IO device wireless communication polling and packet frame system 155 with the gapped position offset value compensation system 151 to insert or translate the received payloads of the wireless IO device compressed input data packets into a standard USB HID compliant report and to add any additionally necessary data to the cursor positional data values not included within the wireless IO device compressed input data packets.

For example, the USB HID format for a mouse may require six bytes of initial position measurement data (e.g., $(X_0, Y_0)$) and six bytes of adjusted positional measurement data (e.g., $(X_1, Y_1)$) for the mouse. In such an embodiment, a first wireless IO device compressed input data packet received from a wireless mouse (e.g., 180) during a first data packet communication frame may contain only the six byte initial positional measurement data (e.g., $(X_0, Y_0)$) and then two bytes indicating an offset change value in positional measurement (e.g., $\Delta X_1, \Delta Y_1$) relative to this initial position measurement data. The controller 150 executing code instructions of the IO device wireless communication polling and packet frame system 155 with the gapped position offset value compensation system 151 in such an embodiment may determine the adjusted positional measurement data for the first wireless IO device compressed input data packet (e.g., $(X_1, Y_1)$) by adding or subtracting the offset change value in positional measurement (e.g., $\Delta X_1, \Delta Y_1$) for the first wireless IO device compressed input data packet to the initial positional measurement data (e.g., $(X_0, Y_0)$). The controller 150 executing code instructions of the IO device wireless communication polling and packet frame system 155 with the gapped position offset value compensation system 151 in such an embodiment may then generate a USB HID report for the first wireless IO device compressed input data packet containing the six bytes of initial position measurement data (e.g., $(X_0, Y_0)$) taken directly from the first wireless IO device compressed input data packet from the first data packet communication frame and then six bytes of adjusted position measurement data (e.g., $(X_1, Y_1)$) determined based on the offset change values in positional measurement (e.g., $\Delta X_1, \Delta Y_1$).

In another example, in later-transmitted wireless IO device compressed input data packets transmitted within the first data packet communication frame or later data packet communication frames, the wireless IO device (e.g., 180) may only transmit an offset change value in positional measurement (e.g., $\Delta X_2, \Delta Y_2$) measured since transmission of the most recently transmitted data packet (e.g., the packet that included the position offset values $\Delta X_1, \Delta Y_1$). The controller 150 executing code instructions of the IO device wireless communication polling and packet frame system 155 with the gapped position offset value compensation system 151 in such an embodiment may determine the updated positional measurement data for the second wireless IO device compressed input data packet (e.g., $(X_2, Y_2)$) for an HID report format by adding or subtracting the offset change value in positional measurement (e.g., $\Delta X_2, \Delta Y_2$) for the second wireless IO device compressed input data packet to the adjusted positional measurement from the first wireless IO device compressed input data packet (e.g., $\Delta X_1, \Delta Y_1$), or by adding the position offset values from both the first and second wireless IO device compressed input data packets (e.g., $\Delta X_1+\Delta X_2, \Delta Y_1+\Delta Y_2$) to the initial positional measurement from the first wireless IO device compressed input data packet (e.g., $(X_0, Y_0)$). This method may be used to determine the updated position measurement data for each successive wireless IO device compressed input data packet so the wireless communication dongle 130 sends the wireless IO non-compressed cursor positional data values in adherence with the HID format to the OS 111.

The controller 150 executing code instructions of the IO device wireless communication polling and packet frame system 155 with the gapped position offset value compensation system 151 in such an embodiment may then generate the USB HID report for the wireless IO device compressed input data packets containing the six bytes of initial position measurement data (e.g., $(X_1, Y_1)$) previously determined for the immediately preceding wireless IO device compressed input data packet of the first data packet communication frame and then six bytes of adjusted position measurement data (e.g., $(X_2, Y_2)$) determined based on the offset change values in positional measurements (e.g., $\Delta X_2, \Delta Y_2$) within the most recently received wireless IO device compressed input data packet or later-received wireless IO device compressed input data packets. The USB HID report in such an embodiment may then be transmitted to the OS 111 for translation of the positional measurements of the mouse into movement of the cursor on the video display 110 or translation of keystrokes received from a wireless keyboard to the OS 111.

As described herein, the determination of the adjusted positional measurement (e.g., $\Delta X_2, \Delta Y_2$) for each successively received wireless IO device compressed input data packet depends upon the wireless IO device position offset values (e.g., $\Delta X_1+\Delta X_2, \Delta Y_1+\Delta Y_2$) within all of the wireless IO device compressed input data packets received previously. However, polling packets are transmitted causing a gap in received wireless IO device compressed input data packet during this polling packet interframe timeslot. Such a gap may affect the wireless communication dongle reporting rate to the information handling system 100. The microcontroller 150 executing code instructions of the wireless IO device gapped position offset value compensation system 151 in an embodiment may compensate for these gapped packets in the reporting rate at the wireless communication dongle, as described in embodiments herein.

The wireless communication dongle 130 or integrated wireless radio adapter in an embodiment may house a microcontroller 150 executing firmware instructions of the IO device wireless communication polling and packet frame system 155 with the gapped position offset value compensation system 151 in an embodiment. The wireless communication dongle 130 may be operatively coupled to the information handling system 100 through insertion of the wireless communication dongle 130 within a Universal Serial Bus (USB) port of the information handling system 100 in an embodiment, for example. In another embodiment, the wireless communication dongle 130 may be incorporated within the housing of the information handling system 100 as part of an integrated wireless radio adapter and operatively coupled to the bus 108 of the information handling system 100 through one of several means for transmitting data, including connection through a USB hub, a Thunderbolt hub, or any other type of data transfer hub known in the art.

The wireless communication dongle 130 in an embodiment may be wirelessly coupled to one or more wireless input output (IO) devices 180 and 190 capable of wirelessly receiving and transmitting data via Bluetooth® Low Energy (BLE) radio layer protocol (e.g., BLE radio with Gaussian Frequency Shift Keying (GFSK) data modulation), as modified with the wireless IO device communication protocol of embodiments herein, with the wireless communication adapter/dongle 130. In some embodiments, the wireless IO devices 180 or 190 may comprise a mouse, keyboard, speaker, headphones, earbuds, headset including a microphone, or various virtual reality peripherals including a headset or handheld input devices. Information handling system 100 may be any information handling system, such as a smart phone, tablet, or laptop, used with a wireless IO device 180 or 190.

The wireless communication dongle wireless radio system 199 or other integrated wireless radio adapter in an embodiment may be capable of communication between the information handling system 100 and the paired wireless IO devices 180 and 190 using a wireless link established using Bluetooth® Low Energy (BLE) radio layer protocol (e.g., BLE radio with Gaussian Frequency Shift Keying (GFSK) data modulation) as modified with the wireless IO device communication protocol of embodiments herein, for example. The wireless communication dongle wireless radio system 199 or other integrated wireless radio adapter in an embodiment may transmit and receive information necessary to pair the wireless IO devices 180 and 190 with the information handling system 100, such as, for example, pairing or wireless communication profiles for pairing the information handling system 100 and the wireless IO devices 180 and 190. Such pairing or wireless communication profiles may operate to identify the wireless IO devices 180 and 190 as a device authorized to transceive data with the information handling system 100 under the paired wireless protocol, as well as information sufficient to identify the wireless IO devices 180 and 190, such as a Media Access Control (MAC) address, IP address, or model number.

The wireless communication dongle wireless radio system 199 may provide connectivity of the wireless communication dongle 130 operatively coupled to the information handling system 100 via wireless links to one or more operatively coupled wireless input/output devices 180 or 190, such as mouse, keyboard, gaming controller, earbuds, headphones, smart speakers, or virtual reality peripherals, as described in greater detail herein. Such wireless links may be established pursuant to BLE radio layer protocol, for example. In some embodiments, BLE radio layer protocol with GFSK data modulation as modified with the wireless IO device communication protocol of embodiments herein may be used to establish a Private Area Network (PAN) (e.g., 170) in which the information handling system 100 may communicate wirelessly with any wireless IO devices (e.g., 180 and 190) paired to the PAN 170 using a BLE radio layer protocol (e.g., BLE radio with GFSK data modulation) compliant pairing and wireless communication profile. The PAN 170 in such an embodiment may communicate data between the information handling system 100 and any paired wireless IO devices (e.g., 180 and 190) over short distances using Ultra High Frequency (UHF) radio waves in the Industrial, Scientific, and Medical purposes bands (ISM bands) between 2.402 and 2.48 GHz. Reference to Bluetooth® may refer to either or both of the Bluetooth® or Bluetooth Low Energy (BLE) and any revision of those protocols.

In some aspects of the present disclosure, the wireless communication dongle wireless radio system 199 may operate two or more wireless links. In other aspects of the present disclosure, the wireless communication dongle 130 may include a plurality of wireless communication dongle wireless radio systems, each capable of establishing a separate wireless link to one of the plurality of wireless IO devices (e.g., 180 or 190), such that the wireless communication dongle 130 may be in communication with a plurality of wireless IO devices (e.g., 180 and 190) via a plurality of wireless links.

The wireless communication dongle wireless radio system 199 may also operate in accordance with any Bluetooth® data communication standards, as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHz Industrial, Scientific, and Medical (ISM) band.

The present disclosure contemplates a computer-readable medium that includes instructions, parameters, and profiles 154 or receives and executes instructions, parameters, and profiles 154 responsive to a propagated signal, so that a device connected to the wireless communication dongle wireless radio system 199 may communicate voice, video or data to the wireless communication dongle 130. The wireless communication dongle 130 may include a set of instructions 154 that may be executed via a microcontroller 150, for example, to cause the wireless communication dongle 130 to perform any one or more of the methods or computer-based functions disclosed herein. For example, instructions 154 may include a particular example of an IO device wireless communication polling and packet frame system 155 with the gapped position offset value compensation system 151, or other aspects or components. Application instructions 154 may also include any application processing drivers, or the like executing on information handling system 100 or wireless communication dongle 130.

The IO device wireless communication polling and packet frame system 155 with the gapped position offset value compensation system 151 may utilize a computer-readable medium 152 in which one or more sets of instructions 154 may operate in part as firmware instructions executed by microcontroller 150 on the wireless communication dongle 130. The instructions 154 may embody one or more of the methods as described herein. For example, instructions relating to the IO device wireless communication polling and packet frame system 155 with the gapped position offset value compensation system 151, firmware, processes, and/or methods may be stored here. More specifically, instructions 154 may be executed by microcontroller integrated circuit 150 or other processing resources such as an embedded controller (EC) or the processor 101 to orchestrate transmission of wireless IO device compressed input data packets from one or more wireless IO devices 180 and 190 with the wireless communication dongle 130 during a data packet communication frame and provide gapped data packet compensation according to embodiments herein. In other embodiments, the instructions 154 may be executed via a controller within the integrated wireless network interface device or wireless radio adapter 160 of the information handling system 100.

Memory 109 located and controlled by the wireless communication dongle 130 may contain computer-readable medium (not shown), such as RAM in an example embodiment. An example of memory 109 includes random access memory (RAM) such as static RAM (SRAM), dynamic RAM (DRAM), non-volatile RAM (NV-RAM), or the like, read only memory (ROM), another type of memory, or a combination thereof. The instructions, parameters, and profiles 154 of the IO device wireless communication polling and packet frame system 155 with the gapped position offset value compensation system 151 may be stored in memory 109 on a computer-readable medium 152 such as a flash memory or magnetic disk in an example embodiment, or may be stored in main memory 102, static memory 103, or within drive unit 107. After an initial pairing process between the wireless communication dongle 130 and a plurality of wireless IO devices (e.g., 180 and 190), the microcontroller 150 may execute code instructions 154 of the IO device wireless communication polling and packet frame system 155 with the gapped position offset value compensation system 151 to orchestrate transmission of a plurality of wireless IO device compressed input data packets from one or more of the wireless IO devices (e.g., 180 or 190) during one or more data packet communication frames, as described in embodiments herein.

The wireless network interface device 160 in an embodiment may be capable of communication between the information handling system 100 and network 170 (e.g., LAN, WLAN, WAN, WLAN) in some embodiments. The wireless network interface device 160 may provide connectivity of the information handling system 100 to the network 170 via a dedicated link, a network access point (AP) or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

In some embodiments, software, firmware, dedicated hardware implementations such as application specific integrated circuits, programmable arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software or firmware executing on hardware, including firmware embedded at a device. Hardware processing resources may include processors or controllers, such as an Intel® brand processor, ARM® brand processors, Qualcomm® brand processors, or other processors and chipsets, or other such devices for software executing on hardware capable of operating a relevant environment of the information handling system. In an embodiment, an information handling system 100 may include an integrated circuit or a board-level product having portions thereof that may also be any combination of hardware and software. Devices, hardware resources, or controllers executing software or firmware modules or programs that are in communication with one another need not be in continuous communication with each other, unless expressly specified otherwise. In addition, devices, hardware resources, or controllers executing firmware or software modules or programs that are in communication with one another may communicate directly or indirectly through one or more intermediaries.

Figure 2:
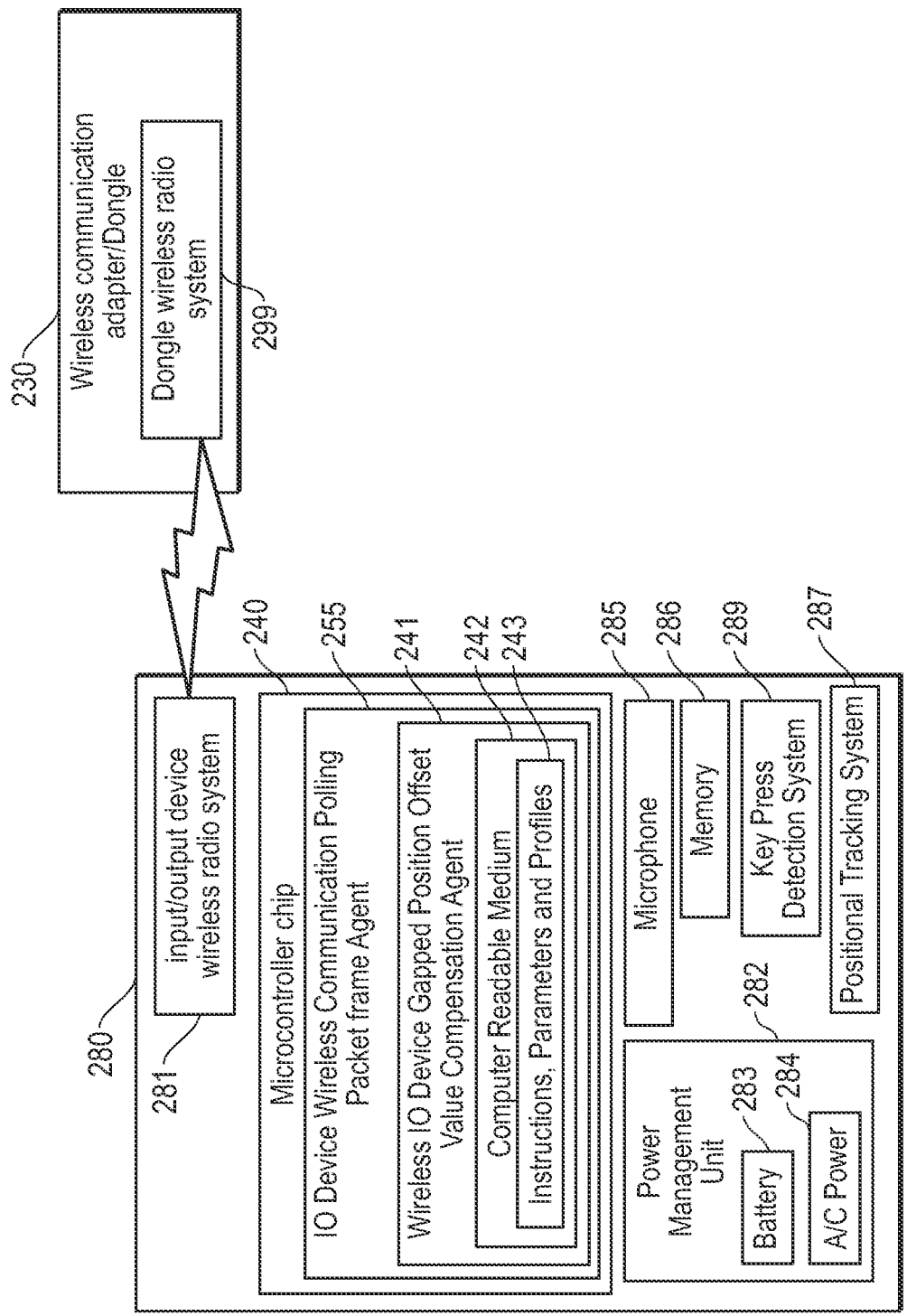
FIG. 2 is a block diagram illustrating a wireless IO device wirelessly paired to a wireless radio adapter or a wireless communication dongle that is operatively coupled to an information handling system according to an embodiment of the present disclosure.

FIG. 2 is a graphical diagram illustrating a wireless communication dongle 230 wirelessly paired to a wireless input/output (IO) device 280 according to an embodiment of the present disclosure. As described previously, the wireless communication dongle 230 may be a dongle device paired to an information handling system or integrated within an information handling system in various embodiments herein. The wireless IO device 280 in various embodiments herein may comprise a mouse, a keyboard, an audio headset, earbuds, gaming controllers, touchpad or various peripheral virtual reality devices (e.g., headset or handheld controllers). A power management unit 282 with a battery 283 or A/C power charging adapter 284 may be on the wireless IO device 280 to provide power to the microcontroller chip 240, the position tracking system 287, the memory 286, or other components of the wireless IO device 280. In an embodiment, the wireless IO device 280 may include a microcontroller chip 250 that may be any device or devices that execute instructions, parameters, and profiles 243 of an IO device wireless communication polling and packet frame agent 255 with gapped position offset value compensation agent 241 at the wireless IO device 280 to transmit wireless IO device compressed input data packets from the wireless IO device 280 to the wireless communication dongle 230 during a data packet communication frame according to orchestrating instructions received from the wireless communication dongle 230. As described herein, the wireless communication dongle 230 in an embodiment may include a controller executing code instructions of an IO device wireless communication polling and packet frame system 240 with gapped position offset value compensation system 241 to orchestrate transmission of plural wireless IO device compressed input data packets from one or more paired wireless IO devices (e.g., 280) during any data packet communication frame. Such an orchestration may be initiated by transmission from the dongle wireless radio system 299 to the IO device wireless radio system 281 of one or more polling packets to each elicit plural data packets, as described herein. The IO device wireless communication polling and packet frame agent 255 with gapped position offset value compensation agent 241 of the wireless IO device 280 may operate to generate wireless IO device compressed input data packets and to instruct the IO device wireless radio system 281 to transmit those compressed data packets within a synchronized data packet communication frame between the wireless communication dongle 230 and the wireless IO device 280 according to the instructions in received polling packets having coordinating instructions as to selected number of packets, selected packet lengths, and allotted time slots to be used.

The IO wireless radio system 281 in an embodiment may be capable of communication between the wireless IO device 280 and the wireless communication dongle 230 using a wireless link established under Bluetooth® or Bluetooth Low Energy (BLE) radio layer protocols (e.g., with Gaussian Frequency Shift Keying (GFSK) data modulation) as modified with the wireless IO device communication protocol of embodiments herein, for example. The IO device wireless radio system 281 may provide connectivity of the wireless IO device 280 to the wireless communication dongle 230, external or integrated, and is operatively coupled to the information handling system via one or more wireless links. Such wireless links may be established pursuant to BLE radio layer protocols (e.g., with Gaussian Frequency Shift Keying (GFSK) data modulation) as modified with the wireless IO device communication protocol of embodiments herein, for example. The IO device wireless radio system 281 may operate in accordance with any Bluetooth® data communication standards or BLE radio layer protocols (e.g., with Gaussian Frequency Shift Keying (GFSK) data modulation) as modified with the wireless IO device communication protocol of embodiments herein. To communicate with a wireless personal area network (WPAN), standards including IEEE 802.15 WPAN standards, Service Discovery Protocol (SDP), Radio Frequency Communications (RFCOMM) protocol, Telephony control protocol (TCS), Logical Link Control and Adaptation Protocol (L2CAP), or similar wireless standards may be used, including standards currently managed by the Bluetooth® Special Interest Group (SIG). Utilization of radiofrequency communication bands according to several example embodiments of the present disclosure may include bands used with the WPAN standards which may use frequency bands such as those within the 2.400 to 2.4835 GHz Industrial, Scientific, and Medical (ISM) band.

The present disclosure contemplates a computer-readable medium 242 that includes instructions, parameters, and profiles 243 or receives and executes instructions, parameters, and profiles 243 responsive to a propagated signal, so that the IO device wireless radio system 281 may communicate voice, video or data to the wireless communication dongle 230, integrated or operatively coupled to the information handling system. In an embodiment in which the wireless IO device 280 comprises a mouse or gaming controller, the wireless IO device 280 may further include a position tracking system 287 capable of recording or tracking position offset values of the mouse with respect to the wireless communication dongle 230, as provided as input by the user of an information handling system. Such positional tracking system 287 may also determine a correlated position change for a cursor or visual graphical representation (e.g., game character, weapon, or camera view) within a software application executing on the information handling system operably connected to the wireless communication dongle 230. This positional information for the mouse or correlated changes to cursors or other graphical representations at the information handling system may be transmitted as data packets to the dongle wireless radio system 299 as described herein.

As also described herein, existing wireless IO devices transceive data packets adhering to the Universal Serial Bus (USB) Human Interface Device (HID) reporting formats for various types of devices that is not well-suited for these higher sample rates. For example, a wireless mouse (e.g., 280) may transceive positional information for the mouse (e.g., 280) according to the USB HID reporting format that requires the positional data to include a six byte description of an initial position and a six byte description of each subsequently adjusted position for the mouse. However, positional data sampled in intervals less than 250-500 microseconds apart may be expressed by providing the initial position, along with an offset change in position away from this initial position to achieve compression of payload data according to embodiment herein. In following wireless IO device compressed input data packets transmitted repeatedly in short intervals (e.g., less than 250 microseconds), the positional data may be expressed by the position offset value alone. Such an offset change in position may be expressed in two bytes to generate wireless IO device compressed input data, in comparison to the six bytes describing a subsequent adjusted position in HID reporting format.

Instructions 243 of the IO device wireless communication polling and packet frame agent 255 with gapped position offset value compensation agent 241 may be executed by the microcontroller chip 250, for example a controller integrated circuit, to transmit such wireless IO device compressed input data packets to the wireless communication dongle 230 at an information handling system pursuant to polling packets generated at the IO device wireless communication polling and packet frame system with gapped position offset value compensation operating at the wireless communication dongle 230 and transmitted to the wireless IO device 280. Such instructions 243 of the IO device wireless communication polling and packet frame agent 255 with gapped position offset value compensation agent 241 may include instructions for initiating generation of wireless IO device compressed input data packets and instructing transmission of those wireless IO device compressed input data packets by the IO device wireless radio system 281 of a selected data packet number, having a selected data packet length, at allotted data packet transmission time slots, as identified within polling packets received at the wireless IO device 280 from the wireless communication dongle 230.

The polling packet transmitted by the controller for the wireless communication dongle 230 in an embodiment may define a selected number of compressed input data packets (e.g., up to six) and a selected compressed data packet length (e.g., in bytes) that instructs the number and length of data packets the wireless IO device 280 should transmit to the wireless communication dongle 230 during wireless IO device allotted time slots within the next data packet communication session. In another aspect of an embodiment, the initial polling packet may identify a frequency hopping table for the wireless IO device 280 to use for transmission of wireless IO device compressed input data packets during future data packet communication frames, until notified otherwise by the wireless communication adapter/dongle 230. The controller 240 for the wireless IO device 280 that receives this polling packet may execute code instructions of the IO device wireless communication polling and packet frame agent 255 with gapped position offset value compensation agent 241 to use these selected values from within the polling packet to set a sample rate at which the wireless IO device 280 takes input (e.g., measures position of the mouse via positional tracking system 287 or registers keystrokes via key press detection system 289). For example, in an embodiment in which the initial polling packet instructs delivery of a wireless IO device compressed input data every 125 μs (e.g., to give a transmission rate of 8,000 packets per second), the wireless IO device 280 may set its sample rate to 125 μs or less. In the case of a mouse, this indicates positional measurements taken every 125 μs by the positional tracking system 287, and in the case of a keyboard, this indicates detection of keypresses every 125 μs by the key press detection system 289.

Setting of such a high sample rate or selection within the polling packet of a shorter wireless IO device compressed input data length in an embodiment may prompt the controller 240 for the wireless IO device 280 to execute code instructions of the IO device wireless communication polling and packet frame agent 255 with gapped position offset value compensation agent 241 to compress the wireless IO device input data detected at the wireless IO device 280 prior to transmission of that wireless IO device input data as a payload of a wireless IO device compressed input data packets to the wireless communication adapter/dongle 230. The controller 240 of the wireless IO device 280 in an embodiment may include a header portion of the data usually included in data packets adhering to the USB HID format requirements described above, to identify the type of wireless IO device (mouse, keyboard, etc.) in order to notify the type of payload and any compression type used from the wireless IO device 280 in the compressed input data packets transceived to the wireless communication adapter/dongle 230.

For example, as described herein, positional data sampled in intervals less than 250-500 microseconds apart may be expressed by providing the initial position, along with data for an offset change in position away from this initial position when a mouse or gaming controller is moved, rather than providing the data bytes initial cursor position data value and a same number of data bytes again for the next adjusted cursor position value. In embodiments in which a wireless mouse (e.g., 280) has set a sample rate to less than 250-500 microseconds between positional measurements taken via the positional tracking system 287, or in which the polling packet received from the wireless communication adapter/dongle 230 instructs transmission of packets in intervals less than 250-500 microseconds apart, the controller 240 for the wireless mouse or gaming controller (e.g., 280) may express positional measurements in each of such wireless IO device compressed input data packets as an initial position in a first data packet and the change or offset in position away from that initial position in later wireless IO device data bytes and later wireless IO device compressed input data packets. This compressed expression of positional measurement may decrease the size of the wireless IO device compressed input data containing this compressed positional measurement by, for example several bytes in most instances, in comparison to the size of a wireless IO device input data packet containing consecutive positional measurements each adhering to the USB HID format.

As described herein, the determination of the adjusted positional measurement (e.g., $\Delta X_2$, $\Delta Y_2$) for each successively received wireless IO device compressed input data packet depends upon the wireless IO device position offset values (e.g., $\Delta X_1 + \Delta X_2$, $\Delta Y_1 + \Delta Y_2$) within all of the wireless IO device compressed input data packets received previously. As such, any dropped packets or measured position offsets not received at the wireless communication adapter/dongle 230 in an embodiment may compromise the ability to determine the position of the wireless communication dongle 230 following such a dropped packet or missed measurement. The wireless communication adapter/dongle 230 in an embodiment may compensate for gaps in wireless IO device position offset values at the wireless communication dongle 230 due to polling packet interframe time slots, as described herein. In such a way, the wireless IO device gapped position offset value compensation system and agent of embodiments of the present disclosure may compensate for a gap in data packets for a next wireless IO device position offset value to be received in a next data packet communication frame with an estimated next wireless IO device position offset value by the wireless communication adapter/dongle 230 to smooth reporting rates from a wireless communication dongle 230.

Identifying information for the wireless IO device 280 may be stored in memory 286 in an embodiment and transmitted in a header with any wireless IO device compressed input data packets for each type of wireless IO device data bytes therein. Such identifying information in an embodiment may operate to identify the wireless IO device 280 type to indicate to the wireless communication dongle 230 what type of compression may have been sent and how to regenerate the HID format report for the wireless IO device 280. The identifying information may also operate to identify the wireless IO device 280 as a device authorized to transceive data with the dongle 230, as well as information sufficient to identify the wireless IO device 280, such as a Media Access Control (MAC) address, IP address, or model number. In some embodiments, the identifying information for the wireless IO device 280 may identify a maximum sample rate for the wireless IO device 280.

The wireless IO device 280 may, in some embodiments includes a processing resource such as a microcontroller 240. Any of the processing resources described herein may be used and may operate to execute code that is either firmware or software code. Instructions 243 may include an IO device wireless communication polling and packet frame agent 255 with gapped position offset value compensation agent 241 or other software applications or drivers detectable by the microcontroller 240 or other processing resource. The instructions 243 in an embodiment may reside completely, or at least partially, within the memory 286.

The wireless IO device 280 may include a set of instructions 243 that may be executed to cause the computer system such as the wireless IO device 280 to perform any one or more of the methods or computer-based functions disclosed herein. For example, instructions 243 may include a particular example of an IO device wireless communication polling and packet frame agent 255 with gapped position offset value compensation agent 241, or other aspects or components.

The IO device wireless communication polling and packet frame agent 255 with gapped position offset value compensation agent 241 on the wireless IO device 280 may utilize a computer-readable medium 242 in which one or more sets of instructions 243 such as firmware executed with microcontroller chip 240, for example a controller integrated circuit with embedded firmware in an example embodiment. In other embodiments, the IO device wireless communication polling and packet frame agent 255 with gapped position offset value compensation agent 241 may operate in part as software or firmware instructions executed on the wireless IO device 280. The instructions 243 may embody one or more of the methods as described herein. For example, instructions relating to the IO device wireless communication polling and packet frame agent 255 with gapped position offset value compensation agent 241, firmware or software algorithms, processes, and/or methods may be stored here.

Memory 286 may contain computer-readable medium (not shown), such as RAM in an example embodiment. An example of memory 286 includes random access memory (RAM) such as static RAM (SRAM), dynamic RAM (DRAM), non-volatile RAM (NV-RAM), or the like, read only memory (ROM), another type of memory, or a combination thereof. Memory 286 may also comprise static memory containing computer-readable medium (not shown), such as NOR or NAND flash memory in some example embodiments. The instructions, parameters, and profiles 243 of the IO device wireless communication polling and packet frame agent 255 with gapped position offset value compensation agent 241 may be stored in memory 286 on a computer-readable medium 242 such as a flash memory or magnetic disk in an example embodiment.

Figure 3:
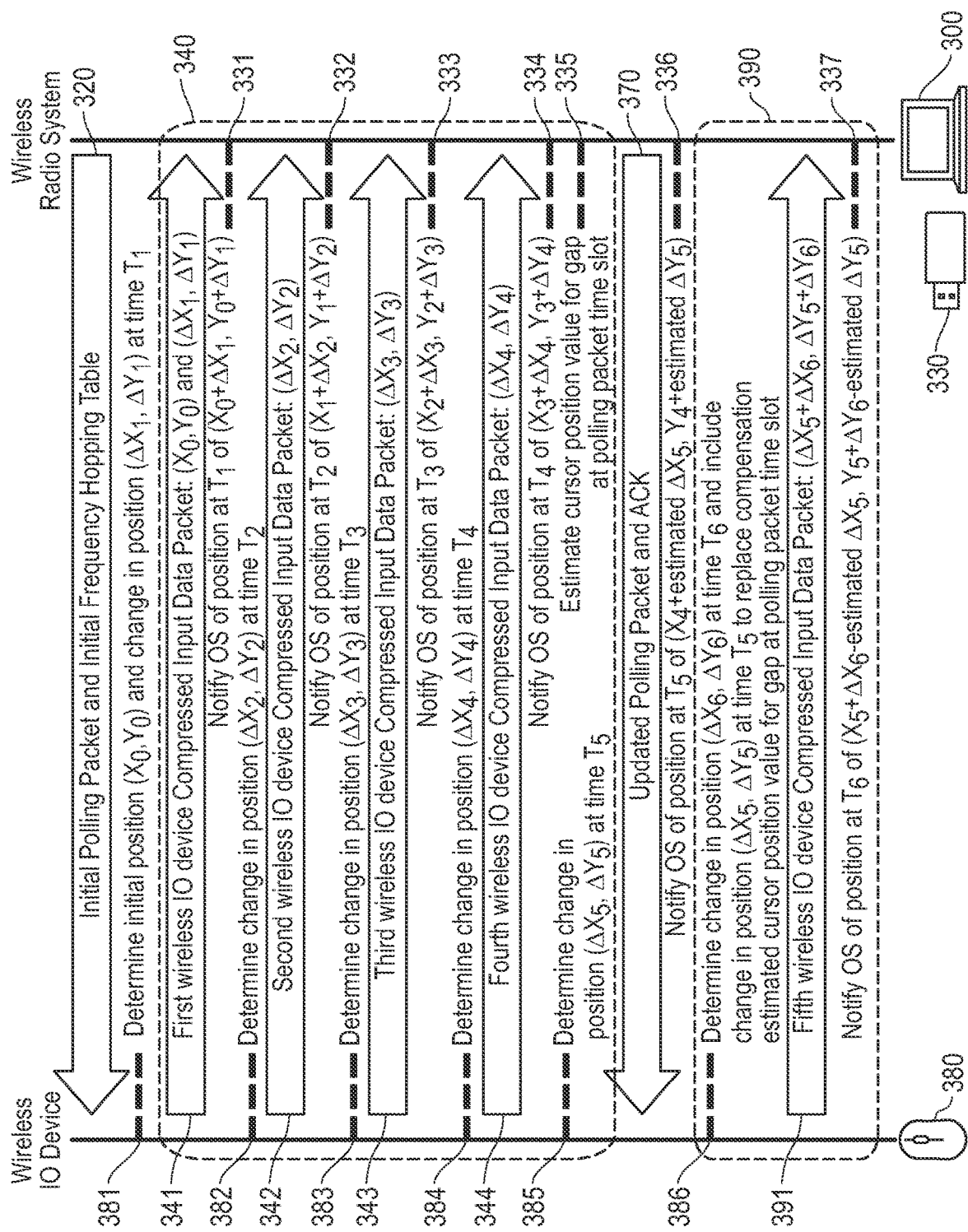
FIG. 3 is a block diagram illustrating a wireless IO device compressed input data packet communication frame orchestrated by the IO device wireless communication polling and packet frame system with compensation for gapped positional offset values during an interframe polling packet timeslot according to an embodiment of the present disclosure.

FIG. 3 is a block diagram illustrating generating a polling packet and a data packet communication frame for communication between a wireless communications dongle or integrated wireless radio system and a paired wireless input/output (IO) device orchestrated by a microcontroller of the wireless communications dongle or integrated wireless radio system. The microcontroller of the wireless communications dongle 330 or integrated wireless radio system of information handling system 300 executes code instructions of the IO device wireless communication polling and packet frame system with gapped position offset value compensation according to an embodiment of the present disclosure. As described herein, the IO device wireless communication polling and packet frame system with gapped position offset value compensation executing at an information handling system 300 or via a controller within a wireless communications dongle 330 operably connected to the information handling system 300 in an embodiment may schedule receipt of a plurality of data packets of a specified number from one or more paired wireless IO devices (e.g., mouse 380) between delivery of polling packets 320 and 370 that include an acknowledgement header (ACK) to each of those one or more paired wireless IO devices (e.g., mouse 380). The IO device wireless communication polling and packet frame system and agent with gapped position offset value compensation may project estimated wireless IO device position offset data values when the polling packets are transmitted during a polling packet interframe time slot to maintain wireless dongle 330 report rate to the information handling system 300. For ease of explanation, the IO device wireless communication polling and packet frame system with gapped position offset value compensation in various embodiments herein may be described as executing at the wireless communications dongle 330 in some embodiments herein. However, it is also contemplated that the IO device wireless communication polling and packet frame system with gapped position offset value compensation may operate internally within an integrated wireless radio system of the information handling system 300 in an embodiment. Further, an IO device wireless communication polling and packet frame agent with gapped position offset value compensation may operate at the wireless IO device (e.g., mouse 380) in various embodiments herein. In any such embodiments, the wireless communication dongle 330 or integrated wireless radio system is capable of establishing wireless links with the wireless IO device 380 according to the Bluetooth® or Bluetooth® Low Energy (BLE) communications protocols, or according to BLE radio layer protocol (e.g., BLE radio with Gaussian Frequency Shift Keying (GFSK) data modulation), as modified according to the wireless IO device communication protocol of embodiments herein.

In an embodiment, the controller of the wireless communications dongle 330 or the information handling system 300 integrated wireless radio system executing code instructions of the IO device wireless communication polling and packet frame system with gapped position offset value compensation in an embodiment may generate an initial polling packet 320 that instructs each of the wireless IO devices (e.g., 380) paired with the wireless communications dongle 330 or the information handling system 300 to transmit a selected number of wireless IO device compressed input data packets of a selected compressed data packet length and at specified allotted time slots during a first data packet communication frame 340 between the wireless communications dongle 330 or the information handling system 300 and each of the paired wireless IO devices (e.g., 380) operatively coupled and having a request to connect 310. In another aspect of an embodiment, the initial polling packet 320 may identify a frequency hopping table for the wireless IO device 380 to use for transmission of wireless IO device compressed input data packets during future data packet communication frames (e.g., 340 and 390), until notified otherwise by the wireless communications dongle 330 or the information handling system 300.

The controller of the wireless communications dongle 330 or the information handling system 300 executing code instructions of the IO device wireless communication polling and packet frame system with gapped position offset value compensation in an embodiment may select a number of compressed input data packets and a compressed data packet length, or wireless IO device allotted transmission time slots for receipt of wireless IO device compressed input data packets transmitted from that wireless IO device 380 based on default initial values that apply to the paired wireless IO device or to a wireless IO device 380 identifiable based on information given within a request to connect. For example, the controller of the wireless communications dongle 330 or the information handling system 300 executing code instructions of the IO device wireless communication polling and packet frame system with gapped position offset value compensation may select a compressed input data packet number of four, a compressed input data packet length of 17 bytes (B), or wireless IO device allotted data packet transmission time slots, with each occurring every 0.000125 seconds (e.g., 125 μs) for receipt of wireless IO device compressed data packets transmitted from the wireless IO device 380 within a data packet communication frame 340 having a total length of 0.0005 seconds. The controller of the wireless communications dongle 330 or the information handling system 300 may instruct the wireless radio system to transmit an initial polling packet 320 containing the selected compressed input data packet number, the selected compressed input data packet length, identified frequency hopping table, and wireless IO device allotted data packet transmission time slots. This initial polling packet 320 in an embodiment may synchronize communication between the wireless communications dongle 330 or the information handling system 300 and the wireless IO device 380 for a data packet communication frame 340 beginning at a specified time and having the specified duration (e.g., 0.0005 seconds). Upon transmission of the initial polling packet 320 in an embodiment, the controller for the wireless communications dongle 330 or the information handling system 300 may switch the wireless radio system into a receive mode to await the beginning of the data packet communication frame 340 from the wireless IO device 380.

As described herein, such an orchestrated delivery of a selected number of wireless IO device compressed input data packets 341, 342, 343, and 34 within the data packet communication frame 340 may allow for the transmission of a wireless IO device compressed input data up to every 0.000125 seconds (125 μs), or at a rate of 8,000 packets per second. Use of this orchestrated delivery method in an embodiment may allow the wireless IO device 380 to transmit input data (e.g., positional information from a mouse) at a high transmission rate, and also to register that input data within the wireless IO device 380 at a high sample rate. In other words, a wireless mouse (e.g., 380) may take positional measurements more frequently.

Existing wireless IO devices transceive data packets adhering to the Universal Serial Bus (USB) Human Interface Device (HID) reporting formats for various types of devices that is not well-suited for these higher sample rates. For example, a wireless mouse (e.g., 380) may transceive positional information for the mouse (e.g., 380) according to the USB HID reporting format that requires the positional data to include a six byte description of an initial position and a six byte description of an adjusted position for the mouse. However, in embodiments of the present disclosure, positional data sampled in intervals less than 250-500 microseconds apart are expressed by providing the initial position in a first data packet 341 of a first communication frame 340, along with an offset change in position values away from this initial position.

A controller of the wireless IO device (e.g., 380) executing code instructions of the IO device wireless communication polling and packet frame agent with gapped position offset value compensation in an embodiment may orchestrate compression of wireless IO device positional information into wireless IO device compressed input data payloads prior to transmission of those wireless IO device compressed input data packets. In an embodiment, the wireless IO device (e.g., mouse 380) that receives the initial polling packet 320 may use values from within the initial polling packet to set a sample rate at which the wireless IO device (e.g., mouse 380) takes input (e.g., measures position of the mouse) as wireless IO device input data. For example, in an embodiment in which the initial polling packet 320 instructs delivery of a wireless IO device compressed input data packet 341-344 within wireless IO device allotted time slots occurring every 125 μs (e.g., to give a transmission rate of 8,000 packets per second), the wireless IO device may set its sample rate to 125 μs or less. In the case of a mouse, this indicates positional measurements taken every 125 μs.

At 381, at a first time $T_1$, the wireless IO device (e.g., mouse 380) may begin to receive input data (e.g., positional measurements for the mouse 380) in the form of Universal Serial Bus (USB) human interface device (HID) formatted reports. This is done since the USB HID formatted wireless IO device input data is to be delivered to the OS of the information handling system 300 in this format. As described herein, existing wireless IO devices transceive data packets adhering to the Universal Serial Bus (USB) Human Interface Device (HID) reporting formats for various types of devices, but such a format is inefficient and is not well-suited for higher sample rates. Setting of such a high sample rate or selection within the initial polling packet 320 of a shorter wireless IO device compressed input data packet length in an embodiment may prompt a controller executing code instructions of an IO device wireless communication polling and packet frame agent with gapped position offset value compensation at the wireless IO device (e.g., mouse 380) to compress the wireless IO device input data detected at the wireless IO device at 323 prior to transmission of that wireless IO device input data as a payload of a wireless IO device compressed input data packet (e.g., 341 to 344) to the wireless communication dongle 330 or information handling system 300 in data packet communication frame 340.

The controller of the wireless IO device (e.g., mouse 380) in an embodiment may include a portion of the data usually included in data packets adhering to the USB HID format requirements described above within the first mouse positional input data packet 341, such as for an initial position value (e.g., $(X_0, Y_0)$), and then use an abbreviated set of data for remaining data bytes normally in the USB HID format in order to decrease the payload of the wireless IO device compressed input data packets (e.g., remaining portions of 341 or data packets 342 to 344 and 391, et cetera) transceived. For example, a first wireless IO device compressed input data packet 341 of a first data packet communication frame 340 (e.g., initial transmission of positional data from the wireless IO device 380 to the wireless communication dongle 330 or information handling system 300 upon establishment of a wireless link) in an embodiment may include a payload comprising the six byte initial position of the wireless IO device 380 (e.g., $(X_0, Y_0)$) and then two bytes indicating a positional offset change value in positional measurement (e.g., $\Delta X_1, \Delta Y_1$) for a next cursor position value relative to this initial position measurement data.

At 331 controller at the wireless communication dongle 330 or information handling system 300 executing code instructions of the IO device wireless communication polling and packet frame system with gapped position offset value compensation in such an embodiment may determine the adjusted positional measurement data for the first wireless IO device compressed input data packet 341 (e.g., $(X_1, Y_1)$) by adding or subtracting the offset change value in positional measurement (e.g., $\Delta X_1, \Delta Y_1$) for the first wireless IO device compressed input data packet 341 with the initial positional measurement data (e.g., $(X_0, Y_0)$). The controller executing code instructions of the IO device wireless communication polling and packet frame system with gapped position offset value compensation in such an embodiment may then regenerate a USB HID report from the first wireless IO device compressed input data packet 341 containing the six bytes of initial position measurement data (e.g., $(X_0, Y_0)$) taken directly from the first wireless IO device compressed input data packet 341 from the first data packet communication frame 340 and then six bytes of adjusted position measurement data (e.g., $(X_1, Y_1)$) determined based on the offset change values in positional measurement (e.g., $\Delta X_1, \Delta Y_1$).

In another example, in later-transmitted wireless IO device compressed input data packets (e.g., 342-344) transmitted within the first data packet communication frame 340 or later data packet communication frames (e.g., 390), the wireless IO device (e.g., 380) may only transmit an offset change value in positional measurement (e.g., $\Delta X_2, \Delta Y_2$) measured since transmission of the most recently transmitted data packet (e.g., 341). At 382, the wireless IO device 380 in an embodiment may determine a position offset value of $\Delta X_2, \Delta Y_2$ at a time $T_2$, occurring between transmission of the first wireless IO device compressed input data packet 341 and the second wireless IO device compressed input data packet 342, and transmit this position offset value as the payload of the second wireless IO device compressed input data packet 342 to the wireless communication dongle 330 or information handling system 300. The controller executing code instructions of the IO device wireless communication polling and packet frame system with gapped position offset value compensation at the wireless communication dongle 330 or the information handling system 300 in such an embodiment may determine the updated positional measurement data for the second wireless IO device compressed input data packet 342 at 332 (e.g., $(X_2, Y_2)$) by adding or subtracting the offset change value in positional measurement (e.g., $\Delta X_2, \Delta Y_2$) for the second wireless IO device compressed input data packet 342 to the adjusted positional measurement from the first wireless IO device compressed input data packet 341 determined at 331, or by adding the position offset values from both the first and second wireless IO device compressed input data packets 341 and 342 (e.g., $\Delta X_1+\Delta X_2, \Delta Y_1+\Delta Y_2$) to the initial positional measurement (e.g., $(X_0, Y_0)$) from the first wireless IO device compressed input data packet 341. This method may be used to determine the updated position measurement data for each successive wireless IO device compressed input data packet received at the wireless communication dongle 330 or the information handling system 300 while maintaining wireless communication dongle 330 report rate to the information handling system 300 with compensation for gaps in wireless IO device compressed input data packets during a polling packet interframe time slot as described in greater detail below with respect to FIG. 4.

For example, at 383, the wireless IO device 380 in an embodiment may determine a position offset value of $\Delta X_3, \Delta Y_3$ at a time $T_3$, occurring between transmission of the second wireless IO device compressed input data packet 342 and the third wireless IO device compressed input data packet 343, and transmit this position offset value as the payload of the third wireless IO device compressed input data packet 343 to the wireless communication dongle 330 or information handling system 300. The wireless communication dongle 330 or the information handling system 300 in an embodiment in which the wireless communication dongle 330 or information handling system 300 received packets 341 and 342 may determine the updated positional measurement data for the third wireless IO device compressed input data packet 343. For example, the wireless communication dongle 330 or the information handling system 300 in such an embodiment may determine the updated positional measurement data (e.g., $(X_3, Y_3)$) at 333 by adding or subtracting the offset change value in positional measurement (e.g., $\Delta X_3, \Delta Y_3$) for the third wireless IO device compressed input data packet 343 to the adjusted positional measurement determined from the second wireless IO device compressed input data packet 342 at 332, or by adding the position offset values from the first, second, and third wireless IO device compressed input data packets 341, 342, and 343 (e.g., $\Delta X_1+\Delta X_2+\Delta X_3, \Delta Y_1+\Delta Y_2+\Delta Y_3$) to the initial positional measurement (e.g., $(X_0, Y_0)$) from the first wireless IO device compressed input data packet 341.

As another example, at 384, the wireless IO device 380 in an embodiment may determine a position offset value of $\Delta X_4, \Delta Y_4$ at a time $T_4$, occurring between transmission of the third wireless IO device compressed input data packet 343 and the fourth wireless IO device compressed input data packet 344, and transmit this position offset value as the payload of the third wireless IO device compressed input data packet 344 to the wireless communication dongle 330 or information handling system 300. The wireless communication dongle 330 or the information handling system 300 in an embodiment in which the wireless communication dongle 330 or information handling system 300 received packets 341, 342, and 343 may determine the updated positional measurement data for the fourth wireless IO device compressed input data packet 344. For example, the wireless communication dongle 330 or the information handling system 300 in such an embodiment may determine the updated positional measurement data (e.g., $(X_4, Y_4)$) at 334 by adding or subtracting the offset change value in positional measurement (e.g., $\Delta X_4, \Delta Y_4$) for the third wireless IO device compressed input data packet 344 to the adjusted positional measurement determined from the second wireless IO device compressed input data packet 343 at 333, or by adding the position offset values from the first, second, third, and fourth wireless IO device compressed input data packets 341, 342, 343, and 344 (e.g., $\Delta X_1+\Delta X_2+$ $\Delta X_3+\Delta X_4$, $\Delta Y_1+\Delta Y_2+\Delta Y_3+\Delta Y_4$) to the initial positional measurement (e.g., $(X_0, Y_0)$) from the first wireless IO device compressed input data packet 341.

In each of these cases (e.g., at 331, 332, 333, or 334) a controller for the wireless communication dongle 330 or information handling system 300 in an embodiment may then generate a USB HID report for each of these determined position measurements (e.g., $(X_1, Y_1)$, $(X_2, Y_2)$, $(X_3, Y_3)$, or $(X_4, Y_4)$) determined based on the wireless IO device position offset values transmitted within wireless IO device compressed input data packets 341, 342, 343, and 344. The USB HID report in such an embodiment may then be transmitted to the OS of information handling system 300 for translation of the positional measurements of the mouse into movement of a cursor on a video display via an OS of the information handling system 300.

At 385, the wireless IO device 380 may determine a position offset value of $\Delta X_5$, $\Delta Y_5$ at a time $T_5$, occurring after transmission of the fourth wireless IO device compressed input data packet 344. However, the wireless IO device 380 may not transmit this position offset value as the payload of a wireless IO device compressed input data packet to the wireless communication dongle 330 or information handling system 300, because the time slot in which it would do so (e.g., immediately after time $T_5$) may be allotted to transmission by the wireless communication dongle 330 or information handling system 300 of an updated polling packet 370. As such, the wireless IO device 380 may store this determined wireless IO device position offset value (e.g., $\Delta X_5$, $\Delta Y_5$) for incorporation within a later transmitted wireless IO device compressed input data packet (e.g., 391) in a second data packet communication frame 390 as described in greater detail below. As a consequence, however, the wireless communication dongle 330 or information handling system 300 may experience a gap in the wireless IO device position offset value (e.g., $\Delta X_5$, $\Delta Y_5$) during the polling packet interframe time slot, shown occurring at 370, in which the wireless communication dongle 330 or information handling system 300 transmits the updated polling packet 370 to the wireless IO device 380.

Following the data packet communication frame 340, the controller of the wireless communications dongle 330 or the information handling system 300 may switch the wireless radio system to a transmit mode for further synchronizing future data packet communication frames (e.g., 390) and also acknowledging receipt or missed packets from a previous data packet communication frame (e.g., 340). The controller may execute code instructions of the IO device wireless communication polling and packet frame system with gapped position offset value compensation in an embodiment to generate and transmit an updated polling packet 370 during the polling packet interframe time slot. In an embodiment, such an updated polling packet 370 may include an acknowledgement header (ACK) identifying the number (N) of packets received during the data packet communication frame 340. For example, in an embodiment in which the Nth packet 360 is the fourth of four packets allotted to the wireless IO device 380 for transmission within the data packet communication frame 340 within the initial polling packet 320, such an updated polling packet 370 may acknowledge receipt of four packets. In some embodiments, one or more of the wireless IO device compressed input data packets 341, 342, 343, or 344 may have been dropped or not received by the wireless communication dongle 330 or information handling system 300. In such an embodiment, the updated polling packet 370 may identify the time slot within the first communication frame 340 in which the dropped packet was expected to be received.

The updated polling packet 370 in an embodiment may further include updated instructions for synchronizing transmission of data packets within a second, later data packet communication frame. For example, the updated polling packet 370 may, at the very least, provide an updated time for initiation of such a second, later data packet communication frame 390. In such an embodiment, the updated polling packet 370 may or may not further adjust one or more of the selected wireless IO device compressed input data packet number, selected wireless IO device compressed input data packet length, or wireless IO device allotted data packet transmission time slots for the wireless IO device 380. For example, in an embodiment, the updated polling packet 370 identifying an updated time for initiation of a second, later data packet communication frame 390 may also provide an updated selected wireless IO device compressed input data packet number equivalent to the initial selected wireless IO device compressed input data packet number. In another example, in an embodiment, the updated polling packet 370 may also provide an updated selected wireless IO device compressed input data packet length equivalent to the initial selected wireless IO device compressed input data packet length. In still another example, in an embodiment, the updated polling packet 370 may also provide updated wireless IO device allotted data packet time slots having the same positions within the second data packet communication frame 390 as the positions of the initial wireless IO device allotted data packet transmission time slots within the first data packet communication frame 340.

At 335, the wireless communication dongle 330 or information handling system 300 in an embodiment may estimate the wireless IO device position offset value measured, but not transmitted by the wireless mouse 380 at 385 due to the polling packet interframe time slot for polling packet 370. At 335, data packet communication frame 340 has been received. As described herein, the wireless communication dongle 330 or information handling system 300 may experience a gap in wireless IO device position offset values, such as for $\Delta X_5$, $\Delta Y_5$, during that polling packet interframe time slot in which the wireless communication dongle 330 or information handling system 300 transmits the updated polling packet 370 to the wireless IO device 380. In order to compensate for the reduced report rate that this gap in transmitted wireless IO device position offset value causes, the wireless communication dongle 330 or information handling system 300 may estimate continued constant or near-constant motion of the next wireless IO device cursor position value, as determined from previously received wireless IO device compressed input data packets (e.g., 341, 342, 343, or 344) to fill the gap until $\Delta X_5$, $\Delta Y_5$ may be transmitted in the fifth wireless IO device compressed input data packet 391. For example, the controller for the wireless communication dongle 330 or information handling system 300 executing code instructions of the IO device wireless communication polling and packet frame system with gapped position offset value compensation in an embodiment may estimate that the gapped wireless IO device position offset value for the upcoming next wireless IO device position offset value (e.g., $\Delta X_5$, $\Delta Y_5$) is equivalent to the wireless IO device position offset value (e.g., $\Delta X_4$, $\Delta Y_4$) transmitted as the payload of the fourth wireless IO device compressed input data packet 334 in the last time slot of the first data packet communication frame 340. As another example, the controller for the wireless communication dongle 330 or information handling system 300 executing code instructions of the IO device wireless communication polling and packet frame system with gapped position offset value compensation in an embodiment may estimate that the gapped wireless IO device position offset value for the upcoming next wireless IO device position offset value (e.g., $\Delta X_5$, $\Delta Y_5$) is equivalent to the average of wireless IO device position offset values (e.g., average of $\Delta X_2$, $\Delta X_3$ and $\Delta X_4$, and average of $\Delta Y_2$, $\Delta Y_3$ and $\Delta Y_4$) transmitted as the payload of one or more previously received wireless IO device compressed input data packets (e.g., 332, 333, and 334) in the first data packet communication frame 340.

In still another embodiment, the controller for the wireless communication dongle 330 or information handling system 300 executing code instructions of the IO device wireless communication polling and packet frame system with gapped position offset value compensation in an embodiment may estimate the gapped wireless IO device position offset value for the upcoming next wireless IO device position offset value (e.g., $\Delta X_5$, $\Delta Y_5$) is equivalent to one pixel of movement in a direction that is equivalent to the direction of position offset (e.g., direction of $\Delta X_4$, or direction of $\Delta Y_4$) transmitted as the payload of the fourth wireless IO device compressed input data packet 334 in the last time slot of the first data packet communication frame 340.

In other words, if the position offset value (e.g., $\Delta X_4$, $\Delta Y_4$) is (+1 or −1, 0), this may indicate horizontal movement (e.g., either right or left). In such a case, the controller for the wireless communication dongle 330 or information handling system 300 executing code instructions of the IO device wireless communication polling and packet frame system with gapped position offset value compensation in an embodiment may estimate the gapped wireless IO device position offset value for the upcoming next wireless IO device position offset value (e.g., $\Delta X_5$, $\Delta Y_5$) is equivalent to one pixel of movement either right or left, depending on the position offset value (e.g., $\Delta X_4$, $\Delta Y_4$). In another example, if the position offset value (e.g., $\Delta X_4$, $\Delta Y_4$) is (0, +1 or −1), this may indicate vertical movement (e.g., either up or down). In such a case, the controller for the wireless communication dongle 330 or information handling system 300 executing code instructions of the IO device wireless communication polling and packet frame system with gapped position offset value compensation in an embodiment may estimate the gapped wireless IO device position offset value for the upcoming next wireless IO device position offset value (e.g., $\Delta X_5$, $\Delta Y_5$) is equivalent to one pixel of movement either up or down, depending on the position offset value (e.g., $\Delta X_4$, $\Delta Y_4$). In still another example, if the position offset value (e.g., $\Delta X_4$, $\Delta Y_4$) is (+1 or −1, +1 or −1), this may indicate diagonal movement (e.g., at a 45 degree angle). In such a case, the controller for the wireless communication dongle 330 or information handling system 300 executing code instructions of the IO device wireless communication polling and packet frame system with gapped position offset value compensation in an embodiment may estimate the gapped wireless IO device position offset value for the upcoming next wireless IO device position offset value (e.g., $\Delta X_5$, $\Delta Y_5$) is equivalent to one pixel of movement in a 45 degree angle, 135 degree angle, −45 degree angle or −135 degree angle from the last known position, depending on the position offset value (e.g., $\Delta X_4$, $\Delta Y_4$).

Following receipt of the updated polling packet 370 in an embodiment, the wireless IO device 380 and the wireless communication dongle 330 or information handling system 300 may begin a second data packet communication frame 390 as instructed within the updated polling packet 370. At 386, the wireless IO device 380 in an embodiment may determine a position offset value of $\Delta X_6$, $\Delta Y_6$ at a time $T_6$, occurring between receipt of the updated polling packet 370 and transmission of the fifth wireless IO device compressed input data packet 391 of the second data packet communication frame 390. As described above, the wireless IO device 380 may have measured and stored, but not transmitted the determined wireless IO device position offset value (e.g., $\Delta X_5$, $\Delta Y_5$) for incorporation within the later transmitted wireless IO device compressed input data packet (e.g., 391). For example, the wireless IO device 380 may transmit the position offset value (e.g., $\Delta X_5$, $\Delta Y_5$) determined at $T_5$ and (e.g., $\Delta X_6$, $\Delta Y_6$) determined at $T_6$ as the payload of the fifth wireless IO device compressed input data packet 391 of the second data packet communication frame 390 to the wireless communication dongle 330 or information handling system 300. It is contemplated that the second data packet communication frame 390 will also have additional wireless IO device compressed input data packets (not shown) in accordance with the selected number of data packets instructed in the polling packet 370 according to various embodiments herein.

In one example embodiment, the wireless communication dongle 330 or the information handling system 300 in an embodiment may determine at 337 the updated positional measurement data (e.g., ($X_5$, $Y_5$)) for the fifth wireless IO device compressed input data packet 391 of the second data packet communication frame 390 at 334 by adding or subtracting the offset change value in positional measurement (e.g., $X_4 + \Delta X_5$, $Y_4 + \Delta Y_5$) for the fifth wireless IO device compressed input data packet 391 as the adjusted positional measurement determined from the fourth wireless IO device compressed input data packet 344 at 334. The gapped data packet compensation may then subtract any values estimated at 335 by the wireless communication dongle 330 or information handling system 300 for the gapped position offset value (e.g., $\Delta X_5$, $\Delta Y_5$) estimated to smooth wireless communication dongle report rates. In another example, the wireless communication dongle 330 or the information handling system 300 in an embodiment may determine the updated positional measurement data (e.g., ($X_6$, $Y_6$)) for the fifth wireless IO device compressed input data packet 391 of the second data packet communication frame 390 at 334 as well by adding the position offset values (e.g., $X_5 + \Delta X_6$, $Y_5 + \Delta Y_6$) from the second data packet communication frame in the fifth wireless IO device compressed input data packet 391. As described herein, the determination of the adjusted positional measurement for each successively received wireless IO device compressed input data packet depends upon the wireless IO device position offset values within all of the wireless IO device compressed input data packets received to date.

At 337 the controller of the wireless communication dongle 330 or information handling system 300 in embodiments may generate an HID report format for cursor positional data from the first data packet frame as well as the second data packet frame, including the updated positional measurement data (e.g., ($X_5$, $Y_5$)) that occurred during the polling packet interframe time slot when the polling packet (e.g., 370) was transmitted by the wireless communication dongle 330 to the wireless IO device 380. Further, the updated positional measurement data (e.g., ($X_5$, $Y_5$)) may replace the previously estimated next positional data value determined by execution of the wireless IO device gapped position offset value compensation system. In this way the wireless IO device gapped position offset value compensation system may maintain a wireless communication dongle report rate and generate consistent HID report format of positional cursor data from the received wireless IO device compressed input data packets. Embodiments of the present disclosure limit the effect from the gap caused by the polling packet transmission between data packet communication frames one the report rate at the information handling system.

Figure 4:
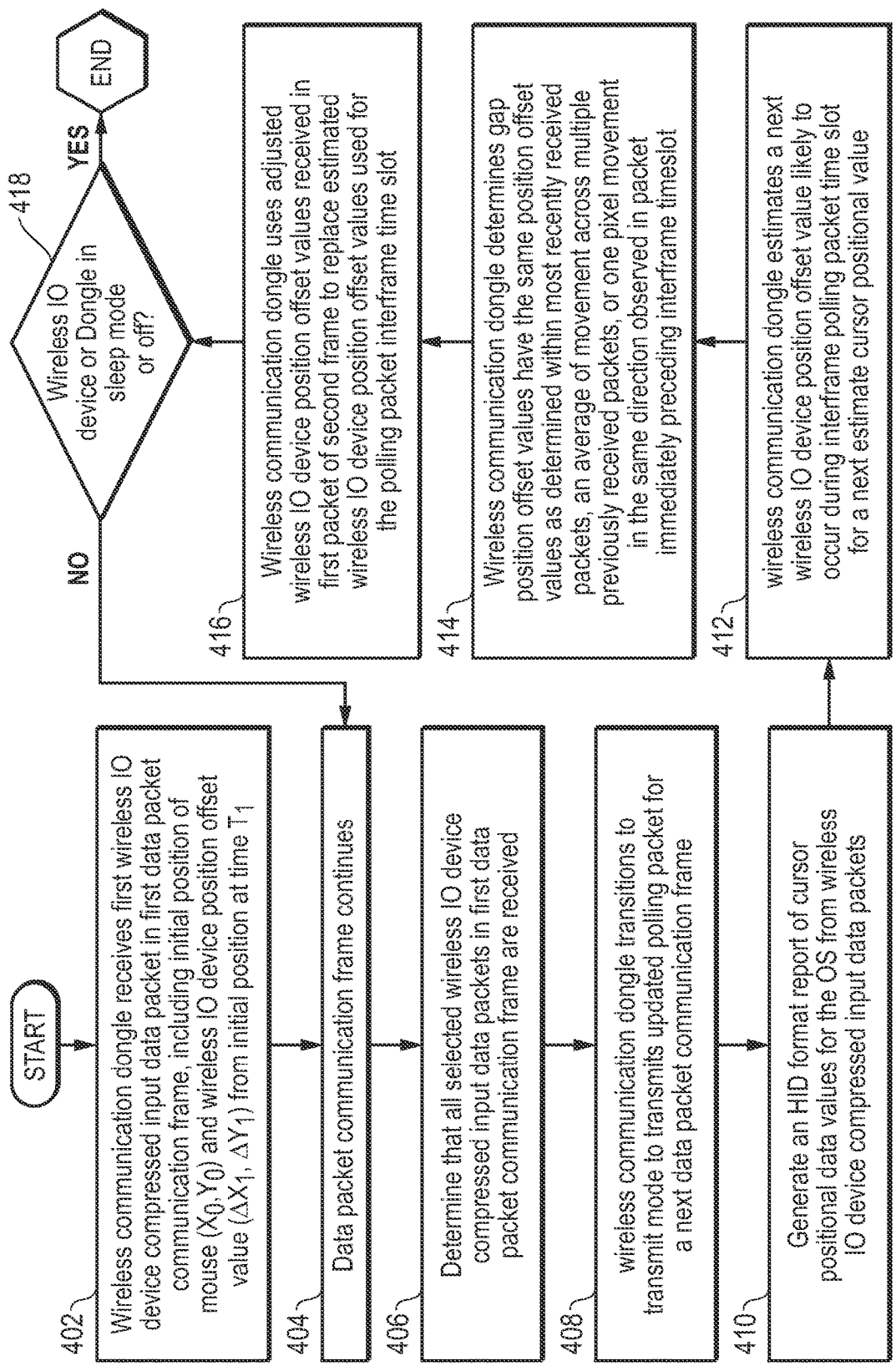
FIG. 4 is a flow diagram illustrating a method of estimating gapped wireless IO device position offset values during an interframe polling packet timeslot for wireless communication dongle reporting rate to the information handling system according to an embodiment of the present disclosure.

FIG. 4 is a flow diagram illustrating a method of estimating gapped wireless IO device position offset values during a polling packet interframe time slot based on previously received wireless IO device position offset values from a recently received data packet communication frame according to embodiments of the present disclosure. As described herein, the wireless IO device gapped position offset value compensation system in an embodiment may compensate for gapped wireless IO device position offset values not transmitted by the wireless IO device during a polling packet interframe time slot allotted to transmission by the wireless communication dongle of an updated polling packet according to embodiments herein.

At block 402, the wireless communication dongle in an embodiment may receive a first wireless IO device compressed input data packet in a first data packet communication frame, including an initial position of a wireless IO device and a wireless IO device position offset value. For example, in an embodiment described with respect to FIG. 3, the wireless IO device 380 may transmit to a wireless communication dongle 330 or information handling system 300 a first wireless IO device compressed input data packet 341 of a first data packet communication frame 340 (e.g., initial transmission of positional data from the wireless IO device 380 to the wireless communication dongle 330 or information handling system 300 upon establishment of a wireless link) that includes a payload comprising the six byte initial position of the wireless IO device 380 (e.g., ($X_0$, $Y_0$)) and then two bytes indicating an offset change value in positional measurement (e.g., $\Delta X_1$, $\Delta Y_1$) relative to this initial position measurement data.

The first data packet communication frame in an embodiment may continue at block 504 with scheduled transmission slots for one or more additional wireless IO device compressed input data packets for the select number of wireless IO device compressed input data packets instructed for the data packet communication frame. For example, the first data packet communication frame 340 in an embodiment may continue with transmission by the wireless IO device 380 to the wireless communication dongle 330 or the information handling system 300 of second, third, and fourth wireless IO device compressed input data packets 342, 343, and 344, respectively. As described herein, the wireless communication dongle 330 or the information handling system 300 in various embodiments may the one or more of these wireless IO device compressed input data packets (e.g., 342, 343, or 344) before transitioning to transmit mode to transmit a updated polling packet for next wireless IO device compressed input data packets for cursor positional data from the wireless IO device in the second data packet communication frame 390. At such a time, a gap in the wireless IO device compressed input data packets may occur in a polling packet interframe time slot while the wireless communication dongle 330 or information handling system 300 transmits the updated polling packet 370.

At block 406, the wireless communication dongle may determine when all of the specified number of the wireless IO device compressed input data packets scheduled for delivery during the first communication frame have been delivered. At such a time, the wireless communication dongle may transition to the transmit mode to prepare an updated polling packet for transmission to the wireless IO device. This causes a gap in the wireless IO device compressed input data packets to occur during a polling packet interframe time slot while the wireless communication dongle 330 or information handling system 300 transmits the updated polling packet 370.

At block 408, the wireless communication dongle generates an updated polling packet, such as 370 with acknowledgement of the selected number of data packets received in the first data packet communication frame and instructions for the selected number of data packets and selected data packet length for the next data packet communication frame 390. During this polling packet interframe time slot, when an updated polling packet is being transmitted, the microcontroller at the wireless communication dongle 330 may execute code instructions of the wireless IO device gapped position offset value compensation system to compensate in the wireless dongle report rate to the information handling system for the gap in the wireless IO device compressed input data packets.

Proceeding to 410, the controller for the wireless communication dongle executes code instructions of the wireless IO device gapped position offset value compensation system to translate the received wireless IO device compressed input data packets of the first data packet communication frame with wireless IO device position offset values from the received payloads into cursor positional data values for the OS of the information handling system. The microcontroller of the wireless communication dongle adds the wireless IO device position offset values to the next most recently determined cursor position value to generate the cursor position value from the wireless IO device position offset value received into an HID reporting format, such as a six byte format. The generated cursor positional data in HID format is then transferred to the OS of the information handling system and a wireless IO device driver may interpret the cursor positional data to move a cursor displayed via an operatively connected digital display in embodiments herein.

At block 412, the controller for the wireless communication dongle executes code instructions of the wireless IO device gapped position offset value compensation system also, upon determining that the selected number of data packets have been transmitted in the previous data packet communication frame, generates a next estimated cursor positional data value during the interframe polling packet time slot by estimating a next wireless mouse position offset value to be received in the second data packet communication frame. The controller for the wireless communication dongle executes code instructions of the wireless IO device gapped position offset value compensation system determines the next estimated cursor position data value. This next estimated cursor positional data value is also transferred to the OS of the information handling system to maintain a smooth reporting rate to the information handling system.

At block 414, the next estimated cursor position data value to compensate for the gap in the wireless IO device compressed input data packets is determined based on received wireless mouse or other wireless IO device position offset values from payloads received in the first data packet communication frame according to embodiments herein. This next estimated cursor positional data value is also transferred to the OS of the information handling system to maintain a smooth reporting rate to the information handling system.

For example, at 335 in FIG. 3, the wireless communication dongle 330 or information handling system 300 in an embodiment may estimate the wireless IO device position offset value measured, but not transmitted by the wireless mouse 380 at 385. As described herein, the wireless communication dongle 330 or information handling system 300 may experience a gapped wireless IO device position offset value (e.g., $\Delta X_5$, $\Delta Y_5$) during the time slot in which the wireless communication dongle 330 or information handling system 300 transmits the updated polling packet 370 to the wireless IO device 380. In order to compensate for this missed or not transmitted wireless IO device position offset value (e.g., $\Delta X_5$, $\Delta Y_5$), the wireless communication dongle 330 or information handling system 300 may estimate continued constant or near-constant motion of the mouse, as determined from previously received wireless IO device compressed input data packets (e.g., 341, 342, 343, or 344). For example, the controller for the wireless communication dongle 330 or information handling system 300 executing code instructions of the IO device wireless communication polling and packet frame system with gapped position offset value compensation in an embodiment may estimate that the missed or not transmitted wireless IO device position offset value (e.g., $\Delta X_5$, $\Delta Y_5$) is equivalent to the wireless IO device position offset value (e.g., $\Delta X_4$, $\Delta Y_4$) transmitted as the payload of the fourth wireless IO device compressed input data packet 334 in the last time slot of the first data packet communication frame 340. As another example, the controller for the wireless communication dongle 330 or information handling system 300 executing code instructions of the IO device wireless communication polling and packet frame system with gapped position offset value compensation in an embodiment may estimate that the missed or not transmitted wireless IO device position offset value (e.g., $\Delta X_5$, $\Delta Y_5$) is equivalent to the average of wireless IO device position offset values (e.g., average of $\Delta X_2$, $\Delta X_3$ and $\Delta X_4$, and average of $\Delta Y_2$, $\Delta Y_3$ and $\Delta Y_4$) transmitted as the payload of one or more previously received wireless IO device compressed input data packets (e.g., 332, 333, and 334) in the first data packet communication frame 340.

In still another embodiment, the controller for the wireless communication dongle 330 or information handling system 300 executing code instructions of the IO device wireless communication polling and packet frame system with gapped position offset value compensation in an embodiment may estimate that the missed or not transmitted wireless IO device position offset value (e.g., $\Delta X_5$, $\Delta Y_5$) is equivalent to one pixel of movement in a direction that is equivalent to the direction of position offset (e.g., direction of $\Delta X_4$, or direction of $\Delta Y_4$) transmitted as the payload of the fourth wireless IO device compressed input data packet 334 in the last time slot of the first data packet communication frame 340.

In other words, if the position offset value (e.g., $\Delta X_4$, $\Delta Y_4$) is (+1 or −1, 0), this may indicate horizontal movement (e.g., either right or left). In such a case, the controller for the wireless communication dongle 330 or information handling system 300 executing code instructions of the IO device wireless communication polling and packet frame system with gapped position offset value compensation in an embodiment may estimate that the missed or not transmitted wireless IO device position offset value (e.g., $\Delta X_5$, $\Delta Y_5$) is equivalent to one pixel of movement either right or left, depending on the position offset value (e.g., $\Delta X_4$, $\Delta Y_4$). In another example, if the position offset value (e.g., $\Delta X_4$, $\Delta Y_4$) is (0, +1 or −1), this may indicate vertical movement (e.g., either up or down). In such a case, the controller for the wireless communication dongle 330 or information handling system 300 executing code instructions of the IO device wireless communication polling and packet frame system with gapped position offset value compensation in an embodiment may estimate that the missed or not transmitted wireless IO device position offset value (e.g., $\Delta X_5$, $\Delta Y_5$) is equivalent to one pixel of movement either up or down, depending on the position offset value (e.g., $\Delta X_4$, $\Delta Y_4$). In still another example, if the position offset value (e.g., $\Delta X_4$, $\Delta Y_4$) is (+1 or −1, +1 or −1), this may indicate diagonal movement (e.g., at a 45 degree angle). In such a case, the controller for the wireless communication dongle 330 or information handling system 300 executing code instructions of the IO device wireless communication polling and packet frame system with gapped position offset value compensation in an embodiment may estimate that the missed or not transmitted wireless IO device position offset value (e.g., $\Delta X_5$, $\Delta Y_5$) is equivalent to one pixel of movement in a 45 degree angle, 135 degree angle, −45 degree angle or −135 degree angle from the last known position, depending on the position offset value (e.g., $\Delta X_4$, $\Delta Y_4$).

The controller to generates a human interface device (HID) formatted report that includes the cursor positional data values and the next estimated cursor positional data value to maintain a smooth wireless communication dongle reporting rate to the information handling system in embodiments herein.

Proceeding to block 416, the microcontroller at the wireless communication dongle 330 may execute code instructions of the wireless IO device gapped position offset value compensation system to receive the next or second data packet communication frame which includes the next cursor positional data value as a next wireless IO device position offset value (e.g., $\Delta X_5$, $\Delta Y_5$) in a payload of the first wireless IO device compressed input data packet 391 in an embodiment. This next wireless IO device position offset value (e.g., $\Delta X_5$, $\Delta Y_5$) serves as an first updated wireless IO device position offset value in a first allotted time slot of the second data packet communication frame that was measured between transmission during a last allotted time slot of the first data packet communication frame and transmission in the first allotted time slot of the second data packet communication frame. The controller of the wireless communication dongle provides this updated wireless IO device position offset value (e.g., $\Delta X_5$, $\Delta Y_5$) as a replacement for the next estimated cursor positional data value. The updated wireless IO device position offset value (e.g., $\Delta X_5$, $\Delta Y_5$) converted to a next, updated cursor positional data value and is transferred to the OS of the information handling system along with additional translated cursor positional data values from the remaining wireless IO device compressed input data packets in the next or second data packet communication frame.

For example, the wireless communication dongle in an embodiment may adjust cursor positional values sent to the OS using the updated wireless IO device position offset value received in the second data packet communication frame at block 416 to remove and replace the estimated next wireless IO device position offset values for the interframe polling packet time slot. For example, the wireless IO device 380 may transmit the position offset value (e.g., $\Delta X_5$, $\Delta Y_5$) determined at $T_5$ and the position offset value (e.g., $\Delta X_6$, $\Delta Y_6$) determined at time $T_6$ as the payload of the fifth wireless IO device compressed input data packet 391 of the second data packet communication frame 390 to the wireless communication dongle 330 or information handling system 300. In one example embodiment, the wireless communication dongle 330 or the information handling system 300 in an embodiment may determine at 336 the updated next cursor positional measurement data (e.g., ($X_5$, $Y_5$)) for the fifth wireless IO device compressed input data packet 391 of the second data packet communication frame 390 at 334 by adding or subtracting the offset change value in positional measurement (e.g., $X_4+\Delta X_5$, $Y_4+\Delta Y_5$) for the fifth wireless IO device compressed input data packet 391 to the adjusted positional measurement determined from the fourth wireless IO device compressed input data packet 344 at 334. Then the wireless communication dongle 330 or information handling system 300 may send the updated next cursor positional measurement value for the gapped position offset value (e.g., $X_5$, $Y_5$) to the OS of the information handling system to replace the previously reported estimated next cursor positional value. In another example, the wireless communication dongle 330 or the information handling system 300 in an embodiment may determine the another positional measurement data (e.g., ($X_6$, $Y_6$)) for the fifth wireless IO device compressed input data packet 391 of the second data packet communication frame 390 at 334 by adding the position offset values (e.g., $\Delta X_6$, $\Delta Y_6$) determined at time $T_6$ to the most recent cursor positional measurement determined from the fifth wireless IO device compressed input data packet 391. In this way, the microcontroller of the wireless communication dongle executing the IO device gapped position offset value compensation system maintains a smooth reporting rate to the information handling system during polling packet interframe time slots of the wireless communication protocol described in embodiments herein.

Flow may proceed to block 418 where the controller of the wireless communication dongle executes code instructions of the wireless IO device gapped position offset value compensation system to determine if the wireless IO device or the wireless communication dongle or information handling system has been turned off or entered a sleep mode. If not, the flow may return to block 404, and the controller of the wireless dongle may continue to execute code instructions of the wireless IO device gapped position offset value compensation system to provide compensation for gaps in received wireless IO device position offset values during the polling packet interframe time slots according to embodiments herein. If yes, then the method may end.

The blocks of the flow diagram of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless input/output (IO) device gapped position offset value compensation system of a wireless communication dongle at an information handling system comprising:
   a controller to transmit, with a wireless radio system, an initial polling packet to instruct an operatively connected wireless mouse to transmit a first selected number of wireless mouse compressed input data packets within first allotted time slots of a first data packet communication frame, wherein the selected number of wireless mouse compressed input data packets include a two byte payload of wireless mouse position offset values;
   the wireless radio system to transmit, during an interframe polling packet time slot, following the first data packet communication frame, a second, updated polling packet to instruct the wireless mouse to transmit a second selected number of wireless mouse compressed input data packets within second allotted time slots of a second data packet communication frame;
   the controller to execute code instructions of the wireless IO device gapped position offset value compensation system to translate the wireless mouse position offset values from received payloads into cursor positional data values for a cursor displayed via an operatively connected digital display;
   the controller to generate a next estimated cursor positional data value during the interframe polling packet time slot by estimating a next wireless mouse position offset value to be received in the second data packet communication frame based on received wireless mouse position offset values from payloads received in the first data packet communication frame; and
   the controller to generate a human interface device (HID) formatted report that includes the cursor positional data values and the next estimated cursor positional data value to maintain a smooth wireless communication dongle reporting rate to the information handling system.

2. The wireless IO device gapped position offset value compensation system of the wireless communication dongle of claim 1, wherein the first data packet communication frame has a first data packet including an initial wireless mouse position value in a six byte format from which the wireless mouse position offset values are determined.

3. The wireless IO device gapped position offset value compensation system of the wireless communication dongle of claim 1 further comprising:
   the wireless radio system to receive a first updated mouse position offset value in a first allotted time slot of the second data packet communication frame; and the controller adjusts the next estimated cursor positional data value with the first updated mouse position offset value that occurred during the interframe polling packet time slot.

4. The wireless IO device gapped position offset value compensation system of the wireless communication dongle of claim 1 further comprising:
the wireless radio system to receive a first updated mouse position offset value in a first allotted time slot of the second data packet communication frame that was measured between transmission during a last allotted time slot of the first data packet communication frame and transmission in the first allotted time slot of the second data packet communication frame; and
the controller adjusts the next wireless mouse position offset data value to the cursor positional value determined from the first updated mouse position offset value.

5. The wireless IO device gapped position offset value compensation system of the wireless communication dongle of claim 1 further comprising:
the controller to estimate the next mouse position offset value during the interframe polling packet time slot as equivalent to mouse position offset values from a payload received during a last allotted time slot of the first data packet communication frame.

6. The wireless IO device gapped position offset value compensation system of the wireless communication dongle of claim 1 further comprising:
the controller to estimate the next wireless mouse position offset value during the interframe polling packet time slot as equivalent to an average of mouse position offset values from a plurality of payloads received during a plurality of allotted time slots of the first data packet communication frame.

7. The wireless IO device gapped position offset value compensation system of the wireless communication dongle of claim 1 further comprising:
the controller to estimate the next wireless mouse position offset value during the interframe polling packet time slot as equivalent to one pixel of movement in an estimated mouse position offset direction that matches a mouse position offset direction from a payload received during a last allotted time slot of the first data packet communication frame.

8. A method of compensation for gapped wireless input/output (IO) position offset value at a wireless communication dongle of an information handling system comprising:
transmitting, via a controller with a wireless radio system, an initial polling packet to instruct an operatively connected wireless IO device to transmit a first selected number of wireless IO device compressed input data packets within first allotted time slots of a first data packet communication frame, wherein the selected number of wireless IO device compressed input data packets include a two byte payload of wireless IO device position offset values;
transmitting, via the wireless radio system, during an interframe polling packet time slot, following the first data packet communication frame, a second, updated polling packet to instruct the wireless IO device to transmit a second selected number of wireless IO device compressed input data packets within second allotted time slots of a second data packet communication frame;
translating, via the controller, the wireless IO device position offset values from received payloads into cursor positional data values for a cursor displayed via an operatively connected digital display;
generating, via the controller, a next estimated cursor positional data value during the interframe polling packet time slot by estimating a next wireless IO device position offset value based on wireless IO device position offset values from payloads received in the first data packet communication frame; and
generating, via the controller, a human interface device (HID) formatted report that includes the cursor positional data values for processing by a processor of the information handling system executing code instructions of an operating system and includes the next estimated cursor positional data value to maintain a smooth reporting rate;
receiving, via the wireless radio system, a first updated wireless IO device position offset value in a first allotted time slot of the second data packet communication frame indicating wireless IO device position offset values measured between transmission during a last allotted time slot of the first data packet communication frame and transmission in the first allotted time slot of the second data packet communication frame; and
adjusting, via the controller, the next cursor positional data value to be determined from the first updated wireless IO device position offset value.

9. The method of claim 8, wherein the first data packet communication frame has a first data packet including an initial wireless IO device position value in a six byte format from which the wireless IO device position offset values are determined.

10. The method of claim 8, wherein the first data packet communication frame and the interframe polling packet time slot together have a duration of less than five hundred microseconds.

11. The method of claim 8 further comprising:
the controller to estimate the next wireless IO device position offset value during the interframe polling packet time slot as a projection of constant speed and trajectory of cursor position from the preceding received wireless IO device position offset value from a payload received during a last allotted time slot of the first data packet communication frame.

12. The method of claim 8 further comprising:
the controller to estimate the next wireless IO device position offset value during the interframe polling packet time slot as equivalent to wireless IO device position offset values from a payload received during a last allotted time slot of the first data packet communication frame.

13. The method of claim 8 further comprising:
the controller to estimate the next wireless IO device position offset value during the interframe polling packet time slot as equivalent to an average of wireless IO device position offset values from a plurality of payloads received during a plurality of allotted time slots of the first data packet communication frame.

14. The method of claim 8 further comprising:
the controller to estimate the next wireless IO device position offset value during the interframe polling packet time slot as equivalent to one pixel of movement in an estimated wireless IO device position offset direction that matches a wireless IO device position offset direction from a payload received during a last allotted time slot of the first data packet communication frame.

15. A wireless input/output (IO) device gapped position offset value compensation system of a wireless communication dongle at an information handling system comprising:
- a controller to transmit with a wireless radio system an initial polling packet to instruct an operatively connected wireless IO device to transmit a first selected number of wireless IO device compressed input data packets within first allotted time slots of a first data packet communication frame, wherein the selected number of wireless IO device compressed input data packets include a two byte payload of wireless IO device position offset values;
- the wireless radio system to transmit, during an interframe polling packet time slot, following the first data packet communication frame, a second, updated polling packet to instruct the wireless IO device to transmit a second selected number of wireless IO device compressed input data packets within second allotted time slots of a second data packet communication frame;
- the first data packet communication frame and the interframe polling packet time slot together having a duration of less than five hundred microseconds;
- the controller to execute code instructions of the wireless IO device gapped position offset value compensation system to translate the wireless IO device position offset values from received payloads into cursor positional data values for a cursor displayed via an operatively connected digital display;
- the controller to generate a next estimated cursor positional data value during the interframe polling packet time slot by estimating a next wireless IO device position offset value based on wireless IO device position offset values from payloads received in the first data packet communication frame; and
- the controller to generate a human interface device (HID) formatted report that includes the cursor positional data values and the next estimated cursor positional data value to maintain a smooth wireless communication dongle reporting rate to an operating system of the information handling system.

16. The wireless IO device gapped position offset value compensation system of the wireless communication dongle of claim 15, wherein the first data packet communication frame has a first data packet including an initial wireless IO device position value in a six byte format from which the wireless IO device position offset values are determined.

17. The wireless IO device gapped position offset value compensation system of the wireless communication dongle of claim 15 further comprising:
- the wireless radio system to receive a first updated wireless IO device position offset value in a first allotted time slot of the second data packet communication frame indicating wireless IO device position offset values measured between transmission during a last allotted time slot of the first data packet communication frame and transmission in the first allotted time slot of the second data packet communication frame; and
- the controller to adjust the next estimated wireless IO device position offset value to the cursor positional data value determined from the first updated wireless IO device position offset values received after the interframe polling packet time slot.

18. The wireless IO device gapped position offset value compensation system of the wireless communication dongle of claim 15 further comprising:
- the controller to estimate the next wireless IO device position offset value during the interframe polling packet time slot as equivalent to wireless IO device position offset values from a payload received during a last allotted time slot of the first data packet communication frame.

19. The wireless IO device gapped position offset value compensation system of the wireless communication dongle of claim 15 further comprising:
- the controller to estimate the next wireless IO device position offset value during the interframe polling packet time slot as equivalent to an average of wireless IO device position offset values from a plurality of payloads received during a plurality of allotted time slots of the first data packet communication frame.

20. The wireless IO device gapped position offset value compensation system of the wireless communication dongle of claim 15 further comprising: the controller to estimate the next wireless IO device position offset value during the interframe polling packet time slot as equivalent to one pixel of movement in an estimated wireless IO device position offset direction that matches a wireless IO device position offset direction from a payload received during a last allotted time slot of the first data packet communication frame.

* * * * *